(12) United States Patent
Kanai

(10) Patent No.: US 7,627,118 B2
(45) Date of Patent: Dec. 1, 2009

(54) SCANNER DEVICE, SCANNER SYSTEM AND IMAGE PROTECTION METHOD

(75) Inventor: Yoichi Kanai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 945 days.

(21) Appl. No.: 10/993,666

(22) Filed: Nov. 18, 2004

(65) Prior Publication Data

US 2005/0141010 A1  Jun. 30, 2005

(30) Foreign Application Priority Data

Nov. 21, 2003  (JP) .............................. 2003-392767

(51) Int. Cl.
*H04N 7/167* (2006.01)
*H04L 29/06* (2006.01)
*G06F 7/04* (2006.01)

(52) U.S. Cl. .......................... 380/203; 713/165; 726/27

(58) Field of Classification Search .................. 380/51, 380/203; 713/165; 726/27
See application file for complete search history.

(56) References Cited

U.S. PATENT DOCUMENTS

| | | | |
|---|---|---|---|
| 5,267,313 A | 11/1993 | Hirata | |
| 5,583,941 A | 12/1996 | Yoshida et al. | |
| 6,289,450 B1 | 9/2001 | Pensak | |
| 6,574,648 B1 * | 6/2003 | Oohashi et al. | 708/402 |
| 6,603,864 B1 * | 8/2003 | Matsunoshita | 382/100 |
| 6,647,388 B2 | 11/2003 | Numao | |
| 6,687,406 B2 * | 2/2004 | Ito | 382/232 |
| 7,231,042 B2 * | 6/2007 | Kori et al. | 380/201 |
| 2002/0126909 A1 * | 9/2002 | Ito | 382/243 |

FOREIGN PATENT DOCUMENTS

| | | |
|---|---|---|
| JP | H06-102822 | 4/1994 |
| JP | H07-115552 | 5/1995 |
| JP | H11-261826 | 9/1999 |
| JP | 2002-123767 | 4/2002 |

OTHER PUBLICATIONS

Japanese Office Action for JP2003-392767, Issued date Dec. 7, 2007, 2 pages.
Japanese Office Action Issued Jul. 15, 2008 for Japanese Application No. 2003-392767, 1 page.

* cited by examiner

*Primary Examiner*—Nasser G Moazzami
*Assistant Examiner*—Mohammad W Reza
(74) *Attorney, Agent, or Firm*—Blakely, Sokoloff, Taylor & Zafman LLP

(57) ABSTRACT

A scanner device that optically reads an image comprises a protect specification data detection unit that detects a protect specification data which is contained in the read image to request protection of image data of the image. A protected image data creation unit encrypts the image data of the image containing the protect specification data, in response to a detection signal of the protect specification data detection unit that indicates that the protect specification data in the image has been detected, so that a protected image data is created.

7 Claims, 21 Drawing Sheets

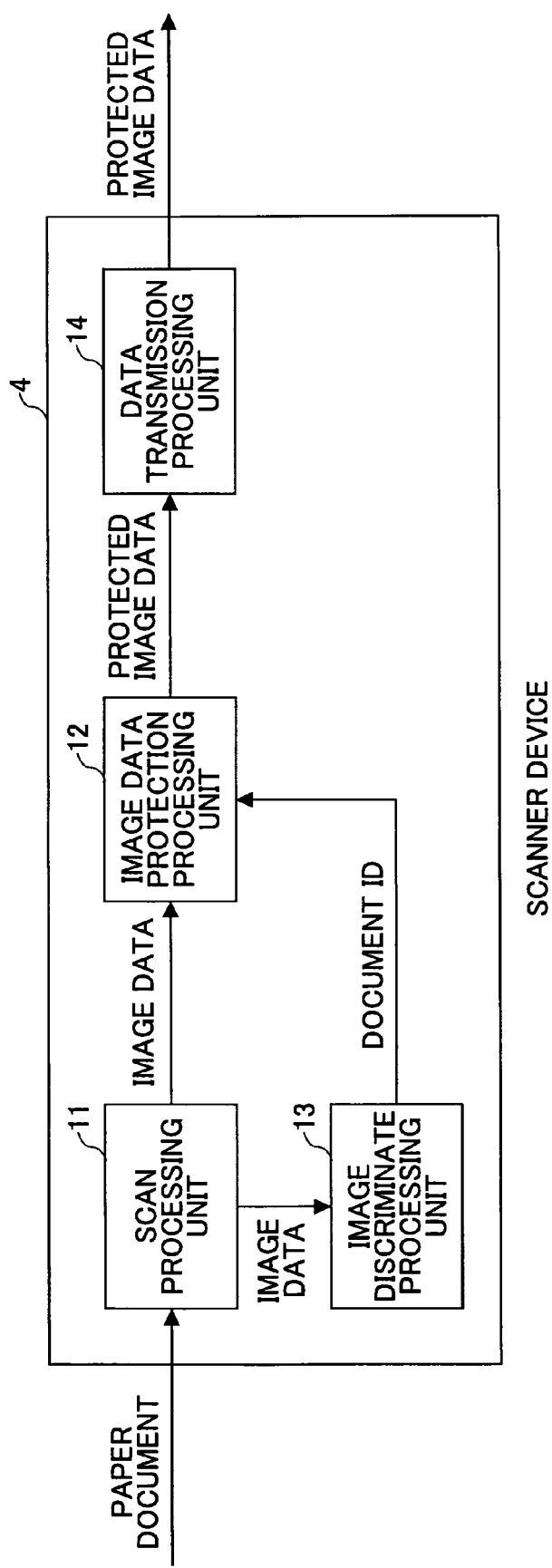

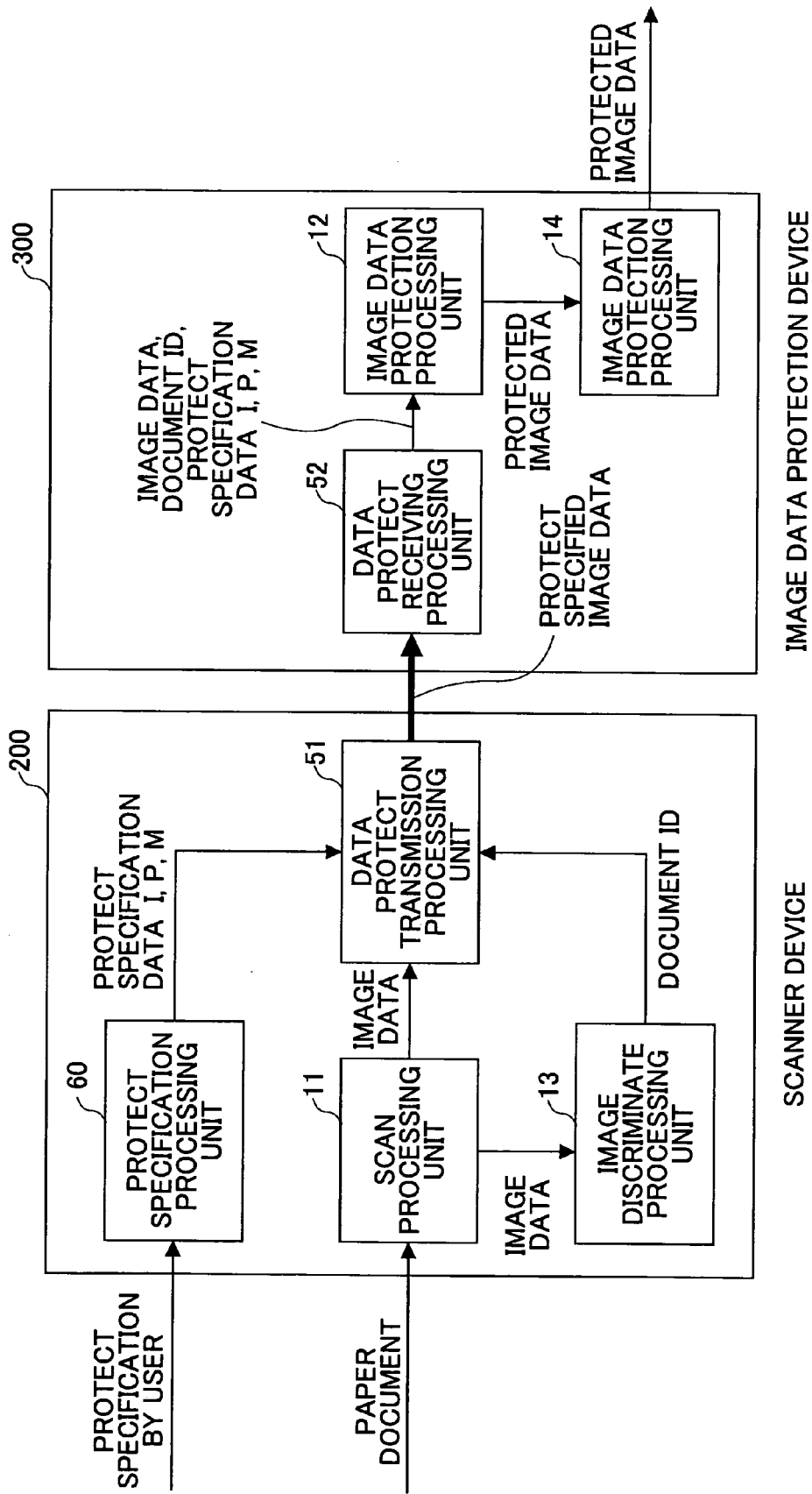

SCANNER DEVICE, SCANNER SYSTEM AND IMAGE PROTECTION METHOD

The present application claims priority to the corresponding Japanese Application No. 2003-392767, filed on Nov. 21, 2003, the entire contents of which are hereby incorporated by reference.

BACKGROUND OF THE INVENTION

1. Field of the Invention

The present invention relates to a scanner device, a scanner system and an image protection method for protecting the image data optically read by the scanner device.

2. Description of the Related Art

Document data the security of which is taken into consideration in various scenes are dealt with at the offices, the research institutes, or the like. For example, at the time of accessing the data of original image with high confidentiality, the matching of the password is required. At the time of printing the secret document, it is printed with a stamp of the mark indicating that the printed document is the secret document.

Security is taken into consideration at the stages of accessing and printing the secret document, in this way. However, in many cases, once the secret document is outputted, how to deal with the outputted document has not been settled.

For example, when the secret document is acquired with the scanner device, adding the viewing restriction or the access restriction to the acquired image data (electronic file) is not usually performed. Therefore, there is no substantial difference between the manner the acquired image data of a secret document is treated and the manner the acquired image data of a common document is treated.

On the other hand, there is the method of encrypting the electronic file that is proposed as the method of protection of the electronic file. For example, see Japanese Laid-Open Patent Application No. 2002-123767.

According to the method of Japanese Laid-Open Patent Application No. 2002-123767, the electronic file is encrypted, and the viewing of the encrypted electronic file by the third party can be inhibited. The personnel who is authorized to view the contents of this electronic file can acquire the key data that enables the encrypted electronic file to be decrypted, together with the electronic file. Therefore, the personnel can make use of the electronic file.

However, in the method of encrypting the electronic file of Japanese Laid-Open Patent Application No. 2002-123767, the key data is distributed to the user together with the electronic file, and there is the possibility that outflow or leakage of the key data occur with transmission of the electronic data. Therefore, it must be said that the level of protection of the electronic file of the secret document according to the method of Japanese Laid-Open Patent Application No. 2002-123767 is not adequately high.

Moreover, the user may encrypt the image data of the secret document acquired with the scanner device. However, if the method of encryption is not simple, it is difficult for many users to encrypt the acquired image data.

SUMMARY OF THE INVENTION

A scanner device, scanner system and image protection method is described. In one embodiment, the scanner device comprises a protect specification data detection unit to detect protect specification data that is contained in the image to request protection of image data of the image, and a protected image data creation unit to encrypt the image data of the image containing the protect specification data, in response to a detection signal from the protect specification data detection unit that indicates that the protect specification data in the image has been detected, to create protected image data.

BRIEF DESCRIPTION OF THE DRAWINGS

Other embodiments, features and advantages of the present invention will be apparent from the following detailed description when reading in conjunction with the accompanying drawings.

FIG. 2 is a block diagram showing the functional composition of the scanner device in the preferred embodiment of the invention.

FIG. 17B is a block diagram showing the functional composition of the scanner device and the image data protection device.

DETAILED DESCRIPTION OF PREFERRED EMBODIMENTS

Figure 1A:
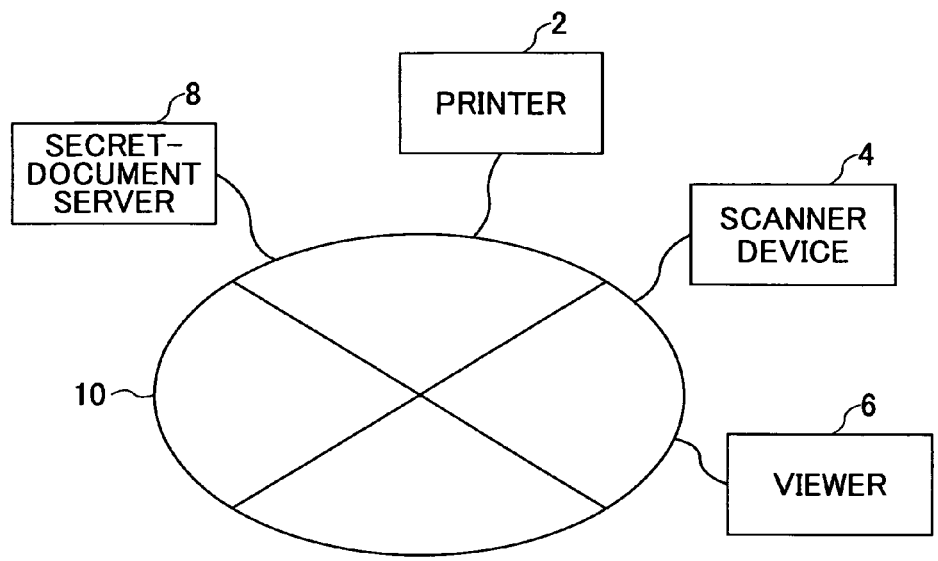
FIG. 1A is a block diagram showing the composition of the network in which the scanner device of the invention is embodied.

An embodiment of the present invention includes an improved scanner device in which the above-described problems are eliminated.

Other embodiments of the present invention include a scanner device, a scanner system and an image protection method that attain protection of the electronic file of the secret document in a convenient way.

The above-mentioned embodiments of the present invention are achieved by a scanner device that optically reads an image, where the scanner device comprises: a protect specification data detection unit detecting protect specification data that is contained in the image to request protection of image data of the image; and a protected image data creation unit encrypting the image data of the image containing the protect specification data, in response to a detection signal from the protect specification data detection unit that indicates that detection of the protect specification data in the image has occurred, so that a protected image data is created.

According to one embodiment of the present invention, when there is a mark in the secret document, such as the bar code printed in the secret document, it is possible to detect the mark automatically so that encryption of the image data can be performed.

The above-mentioned scanner device may have the protect specification data detection unit and the protected image data creation unit separate from each other.

Moreover, above-mentioned embodiments of the present invention are achieved by a scanner device that optically reads an image, comprising: a protect specification data input unit inputting protect specification data that requests protection of image data of the read image; and a protected image data creation unit encrypting the image data of the image, in response to a detection signal of the protect specification data input unit that indicates that inputting of the protect specification data has occurred, so that a protected image data is created.

According to one embodiment of the present invention, when there is an input of the protect specification data that requests protection of image data of the read image, it is possible that encryption of the image data be performed in response to the detection signal that indicates that inputting of the protect specification data has occurred.

The above-mentioned scanner device may have the protect specification data input unit and the protected image data creation unit separate from each other.

Moreover, above-mentioned embodiments of the present invention are achieved by an image protection method for protecting image data of an image optically read by a scanner device, the method comprising: detecting a protect specification data that is contained in the image to request protection of the image data of the image; and encrypting the image data of the image containing the protect specification data, in response to a detection signal that indicates that detection of the protect specification data in the image has occurred, so that a protected image data is created.

Moreover, the above-mentioned embodiments of the present invention are achieved by an image protection method for protecting image data of an image optically read by a scanner device, the method comprising: inputting a protect specification data that requests protection of the image data of the image; and encrypting the image data of the image, in response to a detection signal that indicates that inputting of the protect specification data has occurred, so that a protected image data is created.

Moreover, the above-mentioned embodiments of the present invention are achieved by a scanner system that displays an image optically read by a scanner device, where the scanner system comprises: a protect specification data detection unit detecting a protect specification data that is contained in the read image to request protection of image data of the image; a protected image data creation unit encrypting the image data of the image containing the protect specification data, in response to a detection signal from the protect specification data detection unit that indicates that detection of the protect specification data in the image has occurred, so that a protected image data is created; an image data decryption unit decrypting the protected image data created by the protected image data creation unit; and a decrypted image displaying unit displaying the decrypted image data created by the image data decryption unit, wherein the scanner device comprises the protect specification data detection unit and the protected image data creation unit.

According to one embodiment the scanner system of the present invention, it is possible to realize a system in which the scanner device, the image data decryption unit and the decrypted image displaying unit are separate from each other. For example, only the image data decryption unit is connected on the network and used through the network in the preferred embodiment of the invention.

The image data decryption unit and the decrypted image displaying unit may be integrally provided in the form of a computer with a display device. Alternatively, the image data decryption unit may be provided in the server, and the decrypted image data created by the image data decryption unit may be transmitted via the network and displayed on the screen of any of a plurality of the decrypted image displaying units that are provided in the clients.

In addition, the scanner device of the present invention may be realized in the form of any image forming apparatus having the scanner function including printers, facsimiles, copies, and multi-function peripherals.

According to one embodiment of the present invention, it is possible to provide a scanner device, an image protection method and a scanner system that attain the protection of the electronic file of the secret document in a convenient way.

A description will now be given of the preferred embodiments of the invention with reference to the accompanying drawings.

FIG. 1A shows the composition of the network in which the scanner device of the invention is embodied.

As shown in FIG. 1A, the secret-document server 8 that stores the secret document, the printer 2 that prints the secret document, the scanner device 4 that optically acquires the original image in which the secret document is printed, and the viewer 6 that displays the encrypted image data, are interconnected by the network 10, such as LAN (local area network) and the Internet. Alternatively, the scanner device 4 and the viewer 6 may be connected together directly.

Figure 1B:
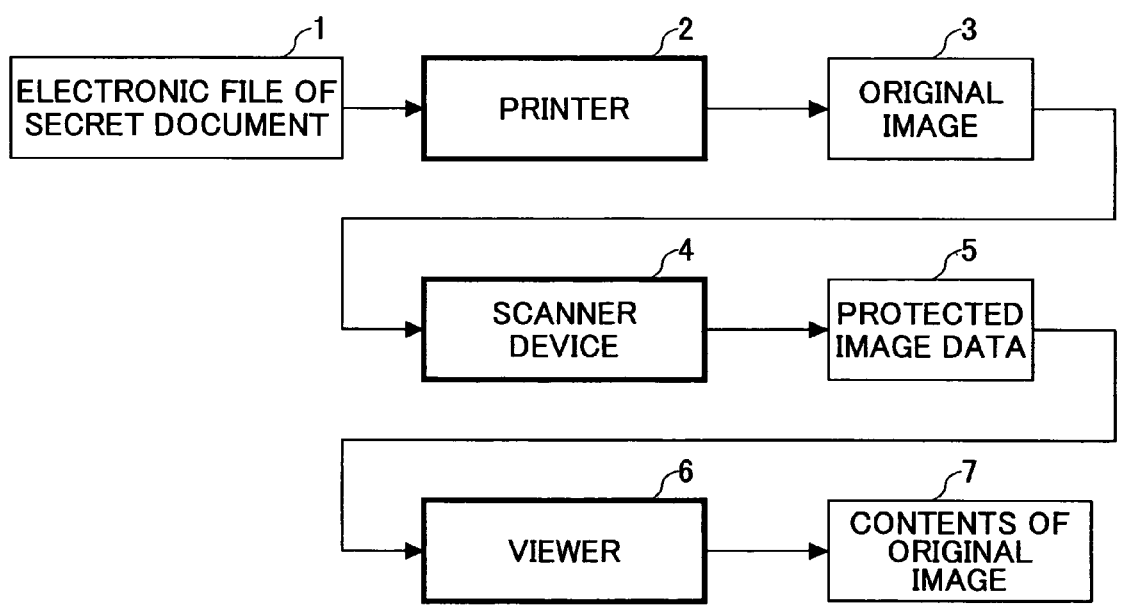
FIG. 1B is a diagram for illustrating the overall processing which performs protection of the image data with the scanner device in the preferred embodiment of the invention.

FIG. 1B shows the overall processing that performs protection of the image data with the scanner device of the present embodiment.

In the present embodiment, for example, the electronic file 1 of the secret document stored by the server 8 is printed by the printer 2, so that the original image 3 is formed on paper by the printing of the printer 2. At the time of printing, the mark (which will be mentioned later) which indicates that the document concerned is the secret document is printed together with the original image 3 by the printer 2 or the user.

When optically reading the original image 3 having the mark indicating that the document concerned is the secret document printed thereon, by using the scanner device 4, the scanner device 4 in the present embodiment is provided to detect automatically the presence of the mark and to determine whether the document (original image) 3 is the secret document.

When the document 3 is the secret document, the scanner device 4 in the present embodiment encrypts the acquired image data so that the protected image data 5 (which will be mentioned later) is created.

In order to view the contents of the protected image data 5, the viewer 6 having the viewing function of the protected image data 5 is used. The contents 7 of the original image are displayed by the viewer 6. The viewer 6 is, for example, a PC (personal computer) having the function of decryption of the encrypted image data.

A description will be given of the functional composition of the scanner device of the present embodiment.

FIG. 2 shows an example of the functional composition of the scanner device in this embodiment.

The scanner device 4 of FIG. 2 is constituted so that it comprises the scan processing unit 11 that optically scans the original image and acquires the image data, the image discriminate processing unit 13 that detects from the acquired image data the mark that indicates that the document concerned is the secret document, the image data protection processing unit 12 that protects the image data by performing encryption, and the data transmission processing unit 14 that transmits the protected image data obtained by the protection processing to the PC or the like.

The scan processing unit 11 optically scans the original image that is printed on paper, and performs the processing that converts the image data into the electronic file (digital data).

When optically reading the document, light from the LED is applied to the original image being read, and the reflected light from the original image is inputted to the solid image pick-up elements, such as the CCD sensor.

The read image is expressed as a gathering of points at a predetermined resolution according to the CCD sensor or the sub-scanning speed, and it is converted for each point into the digital data according to the hue, the lightness and the saturation.

The image discriminate processing unit 13 analyzes the digital data that is acquired by the scan processing unit 11, determines whether the document concerned is the secret document, and in the case of the secret document, the image discriminate processing unit 13 extracts the document ID that identifies the document (original image) concerned.

In addition, the scanner device 4 in the present embodiment is not limited to the so-called scanner that has solely the scanner function. For example, other devices including the copier, the printer, and the fax, which have also the scanner function, may be used as the scanner device 4 in the present embodiment. Furthermore, the scanner unit of the multi-function peripheral (MFP) that has the multiple functions of the copier, the printer, the fax, and the scanner may be used as the scanner device 4 in the present embodiment.

A description will be given of the secret-document mark. Namely, how to determine whether the document concerned is the secret document will be explained.

In the case of the secret document, the document contains the mark (which is called the secret-document mark) that indicates that the document concerned is the secret document, such as the bar code or the two-dimensional code, such as the QR code (registered trademark), which indicates a predetermined number of the document ID, the "confidential", or the like.

Therefore, when such secret-document mark is detected, the image discriminate processing unit 13 determines that the document concerned is the secret document.

Figure 3:
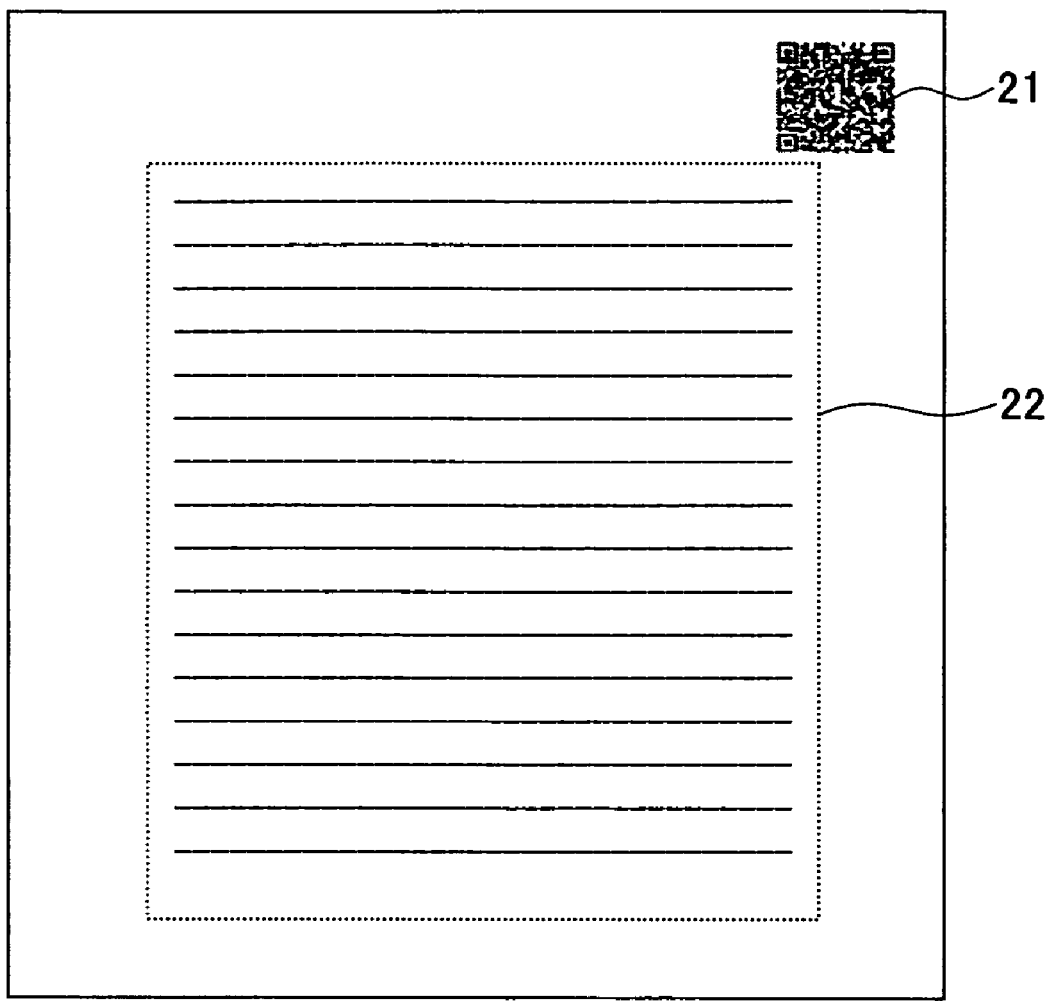
FIG. 3 is a diagram showing an example of the original image containing the secret-document mark.

FIG. 3 shows an example of the original image that contains the secret-document mark.

The original image of FIG. 3 contains the two dimensional code 21 as an example of the secret-document mark. In the example of FIG. 3, the contents of the original image are replaced by the ruled line 22.

The image discriminate processing unit 13 determines whether the document concerned is the secret document, depending on whether the image data exists in the location of the recording sheet where the image data should not exist originally, such as the margin portion of the recording sheet as shown in FIG. 3, or depending on whether the predetermined secret-document mark is contained in the original image.

Figure 4:
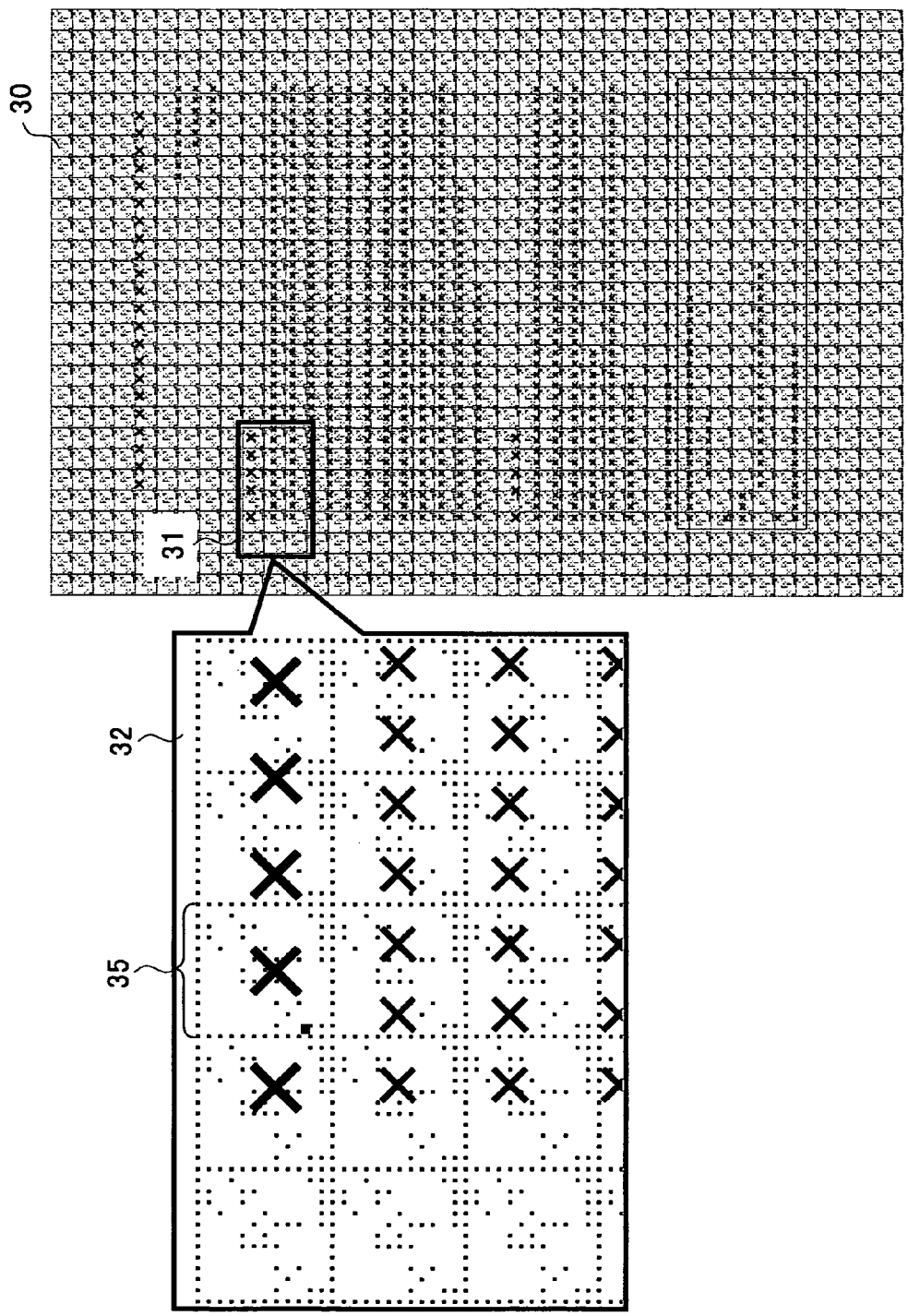
FIG. 4 is a diagram showing an example of the secret-document mark in the dot pattern.

FIG. 4 shows another example of the secret-document mark in the dot pattern.

As shown in FIG. 4, the secret-document mark in the dot pattern is added to the original image 30 and it is superimposed over the contents of the original image on the surface of the document.

As in the enlarged portion 32 that is indicated as the expansion of the unit 31 of the original image 30, the square dot patterns 35 are arranged continuously in the unit 31 of the original image 30.

Assuming that the black dot corresponds to 1 and the blank dot corresponds to 0, each square dot pattern 35, consisting of 12 dots in columns by 12 dots in rows, which theoretically contains the information of 144 bits, can be printed in the background of the document 30.

Practically, it is necessary that all the circumferences of the individual dot patterns 35 are surrounded by the dots so that the boundary of each dot pattern 35 is recognizable, and the extra dots are arranged at the corners of the pattern so that the upper and lower sides of the original image can be distinguished. For this reason, all the information of 144 bits cannot be used for the purpose of the secret-document detection.

However, the information of at least 48 bits can be used even if the additional dots for error correction are used, and the information of the secret-document mark indicating the document ID can be embedded in each dot pattern 35.

Since the document ID is embedded in each dot pattern 35, the document ID may be extracted by selecting a clear dot pattern. Alternatively, the document ID may be extracted based on a plurality of dot patterns chosen. In the latter case, the extraction accuracy will improve.

A description will be given of the image data protection processing according to the present embodiment.

The image data protection processing unit 12 is provided to perform processing that encrypts the image data obtained as the digital data and creates the protected image data by adding the incidental information to the encrypted image data (which will be described later).

Figure 5:
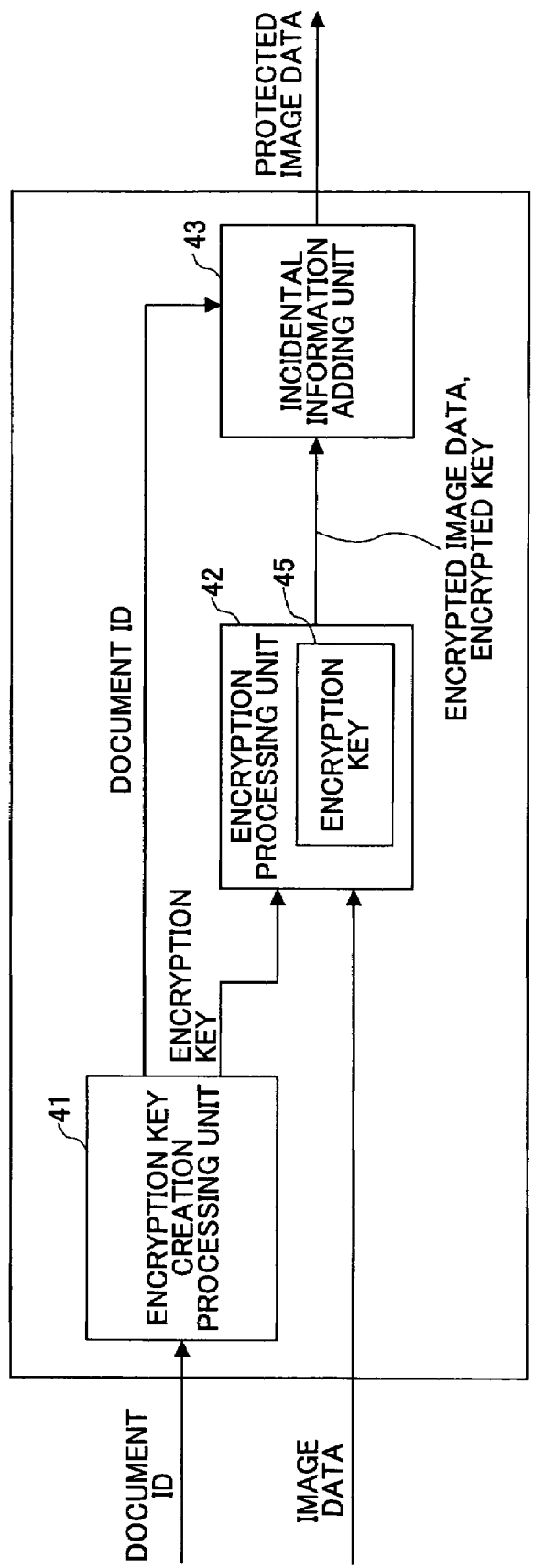
FIG. 5 is a block diagram showing the functional composition of the image data protection processing unit.

FIG. 5 shows an example of the functional composition of the image data protection processing unit 12.

The image data protection processing unit 12 is constituted so that it comprises the encryption key creation processing unit 41 that creates the encryption key, the encryption processing unit 42 that encrypts the image data by using the encryption key, and the incidental information adding unit 43 that adds the encryption key to the encrypted image data created by the encryption processing unit 42, as incidental information.

Moreover, the encryption processing unit 42 has the master encryption key 45 which will be mentioned later.

The encryption key creation processing unit 41 generates the 128-bit random number, for example. The generated random number is outputted to the encryption processing unit 42.

The encryption processing unit 42 receives the image data from the scan processing unit 11 of FIG. 2 and receives the encryption key from the encryption key creation processing unit 41. The encryption processing unit 42 encrypts the image data using this encryption key and encrypts the encryption key using the master encryption key 45. The master encryption key 45 is not generated as the random number but it is held by the image data protection processing unit 12.

Moreover, since the viewer 6 of FIG. 1B is provided with the same master encryption key 45, so that the viewer 6 decrypts the encrypted key and then decrypts the encrypted image data by using the decrypted key.

A description will be given of the method of encryption according to the present embodiment.

As for the method of encryption, there are public-key cryptographies, including RSA (Rivest Shamir Adleman), the ElGamal code, and the elliptic curve cryptosystem, and common key cryptographies, including DES (Data Encryption Standard), RC4 (Rivest's Cipher 4), IDEA (International Data Encryption Algorithm), FEAL (Fast data Encipherment Algorithm), MISTY.

The common key cryptography is the method of encryption using the same key for the encryption and the decryption. Before transmitting or receiving the cipher, the key that should be made secret is shared by using the safe transmission path beforehand.

The public-key cryptography is the method of encryption that performs the data encryption and the decryption using a pair of the two keys. One of the two keys is open to the public and it is called the public key. The other key is known to and managed by only a specific network administrator, and it is called the private key.

The data encrypted with the private key can be decrypted only with the corresponding public key, while the data encrypted with the public key can be decrypted only with the corresponding private key.

In the present embodiment, the encrypted key is transmitted together with the encrypted image data, and using the common key, the image data is encrypted and the encrypted image data is decrypted again.

For this reason, in the present embodiment, the image data and the encryption key are encrypted using the encryption algorithm of RC4 that is the common key cryptography. The algorithm of RC4 performs the encryption on a 1-bit basis and can set up the length of the key somewhat arbitrarily.

Moreover, as compared with DES, the algorithm of RC4 provides a higher-speed encryption. In addition, it is possible that encryption of the image data and encryption of the encryption key be performed using different algorithms separately.

In addition, the image data acquired with the scanner device 4 immediately after reading optically is formed in the form of any of the raw data, the TIFF (Tagged Image File Format) data format, the JPEG (Joint Photographic Experts Group) data format, the PDF (Potable Document Format) data format. There is the case where the data-format specification at the time of encryption may be specified depending on the kind of data format. In that case, at the time of encrypting the image data in the image data protection processing unit 12, the encryption processing is performed according to the specification of the data format.

A description will be given of the creation of the protected image data.

The encrypted image data is inputted into the incidental information adding unit 43, and the incidental information adding unit 43 creates the protected image data. The incidental information adding unit 43 receives the document ID that is received from the encryption key creation processing unit 41, and receives the encrypted key and the encrypted image data that are inputted from the encryption processing unit 42.

The incidental information adding unit 43 adds the encrypted key and the document ID to the encrypted image data. In the following, the encrypted image data to which the encrypted key and the document ID are added is called the protected image data.

A description will be given of the transmission of the protected image data.

Referring back to FIG. 2, the data transmission processing unit 14 receives the protected image data that is inputted from the image data protection processing unit 12.

The data transmission processing unit 14 transmits the protected image data to the network, such as LAN, the PC, or the server through the Ethernet (registered trademark), the USB interface, or the parallel cable.

Moreover, for example, the slot of the memory card may be provided in the scanner device, and it is possible to record the protected image data in a memory card using the flash memory.

Figure 6:
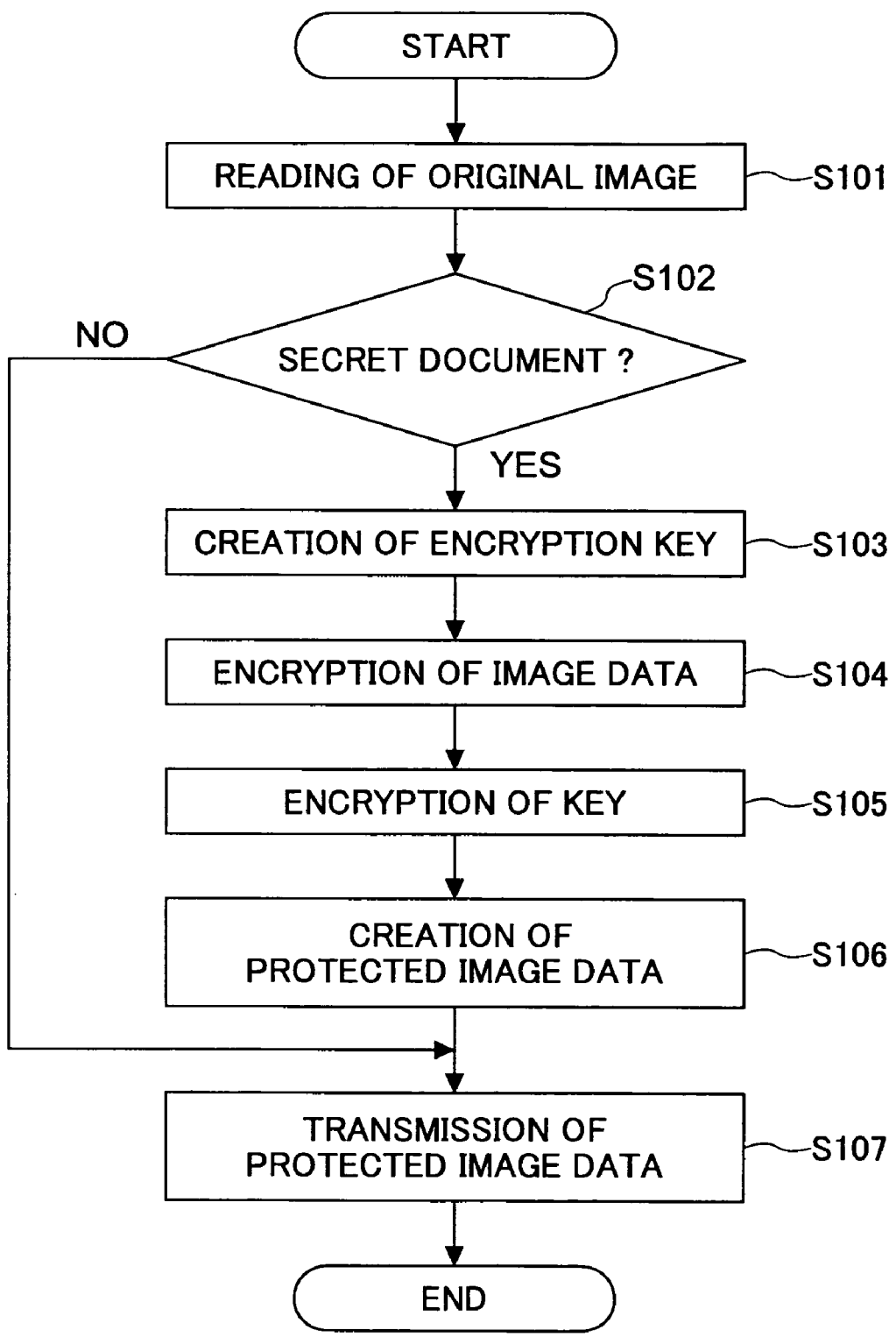
FIG. 6 is a flowchart for illustrating the processing of the image data protection method of the preferred embodiment of the invention to protect the image data.

Based on the above-described composition, the method of protection of the image data in the preferred embodiment of the invention is performed by the scanner device 4 according to the flowchart of FIG. 6. A description will be given of the processing of the image data protection method of the present embodiment with reference to FIG. 6.

At step S101, the scan processing unit 11 acquires the image data of the original image by operation of the user. For example, the scanning of the original image is started when the user presses the predetermined button, and the contents of the original image are converted into the image data. The acquired image data is inputted into the image data protection processing unit 12 and the image discriminate processing unit 13.

At step S102, the image discriminate processing unit 13 determines whether the document concerned is the secret document.

The image discriminate processing unit 13 detects the secret-document mark from the image data. When there is the secret-document mark (YES of S102), the image data protection processing unit 12 creates the protected image data.

When there is no secret-document mark (No of S102), even if the image data is passed, the image data protection processing unit 12 does not create the protected image data.

In addition, the scanner device 4 may be constituted so that when there is no secret-document mark, the image data does not pass the image data protection processing unit 12.

At step S103, the encryption key creation processing unit 41 creates the encryption key (Yes of S102). Since the encryption key is generated as being the random number, the encryption key creation processing unit 41 creates a different encryption key for every document being acquired. The created encryption key is input into the encryption processing unit 42.

At step S104, the encryption processing unit 42 encrypts the image data. In the present embodiment, the encryption processing unit 42 encrypts the image data in accordance with the encryption algorithm of RC4, using the encryption key received from the encryption key creation processing unit 41.

At step S105, the encryption processing unit 42 encrypts the encryption key. In the present embodiment, the encryption processing unit 42 encrypts the encryption key in accordance with the encryption algorithm of RC4, using the master encryption key 45.

At step S106, the incidental information adding unit 43 creates the protected image data. In the present embodiment, the incidental information adding unit 43 adds the encrypted key and the document ID to the encrypted image data, so that the protected image data is created.

At step S107, the data transmission processing unit 14 transmits the protected image data or the image data.

As described above, the image data protected by encryption is transmitted to the predetermined device.

A description will be given of the viewing of the protected image data. The viewing of the image data contained in the protected image data will be explained.

The viewer 6 is used for viewing of the image data contained in the protected image data as described above with FIG. 1B.

Figure 7:
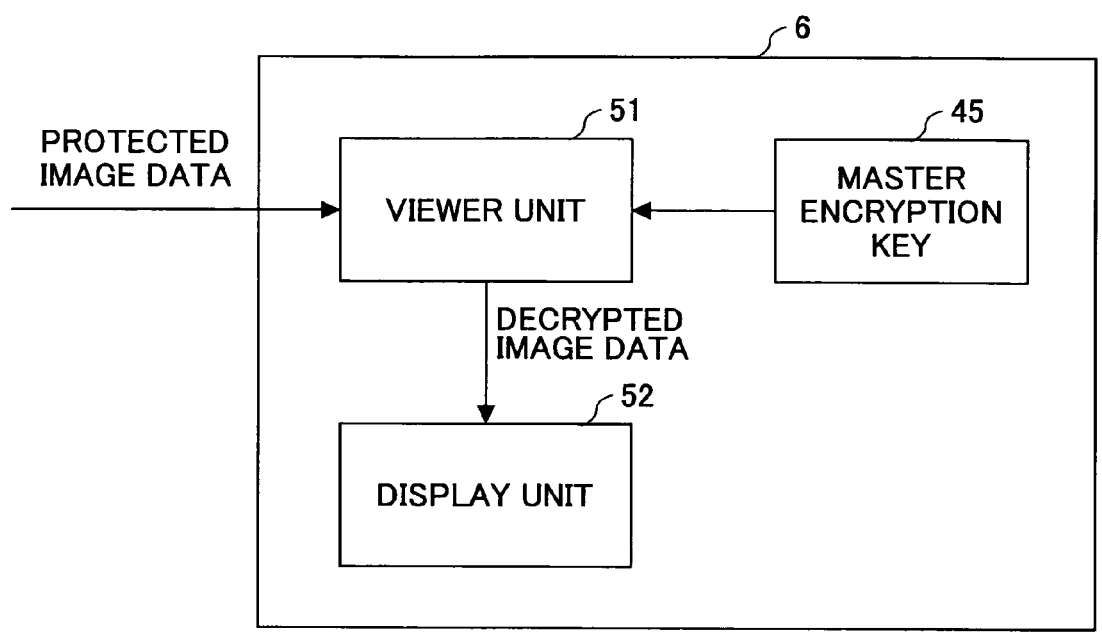
FIG. 7 is a block diagram showing the functional composition of the viewer.

FIG. 7 shows an example of the functional composition of the viewer 6.

The viewer 6 is constituted so that it comprises the viewer unit 51 that performs the decryption of the protected image data, the display unit 52 that displays the decrypted image data, and the master encryption key 45.

In addition, the master encryption key 45 provided in the viewer 6 is the same key as the master encryption key 45 that is held by the encryption processing unit 42.

A description will be given of the method of viewing of the protected image data with reference to the flowchart of FIG. 8A.

At step S201, the protected image data is read by the viewer 6 by operation of the user. The viewer unit 51 acquires the encrypted key from the protected image data.

At step S202, the viewer unit 51 decrypts the encrypted key. In the present embodiment, the viewer unit 51 decrypts the encrypted key using the master encryption key 45.

At step S203, the viewer unit 51 decrypts the encrypted image data. In the present embodiment, the viewer unit 51 decrypts the encrypted image data using the decrypted encryption key.

At step S204, the display unit 52 displays the decrypted image data on the display screen, such as the display monitor.

As described above, the protected image data is displayed.

In order to raise security when viewing the protected image data, the scanner device may be provided to require the authentication of the user.

Figure 8A:
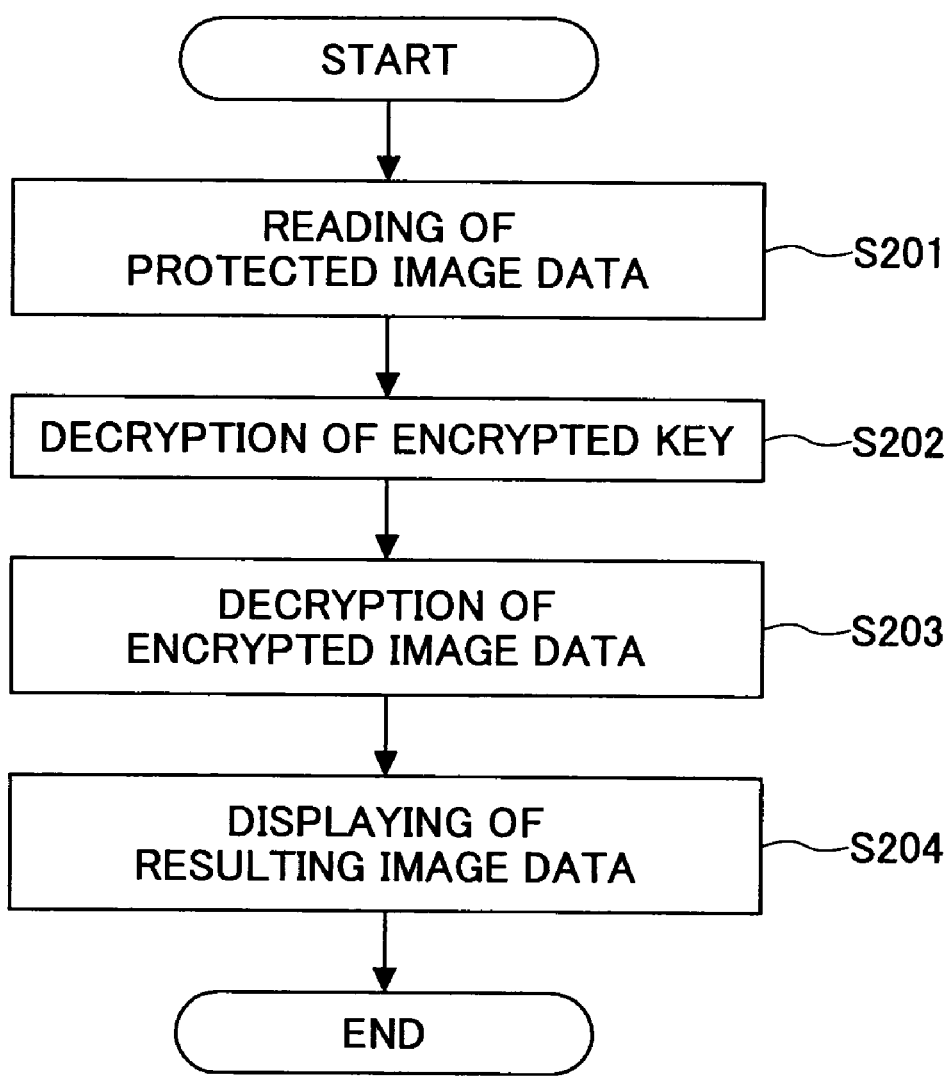
FIG. 8A and FIG. 8B are flowcharts for illustrating the processing that views the protected image data.
Figure 8B:
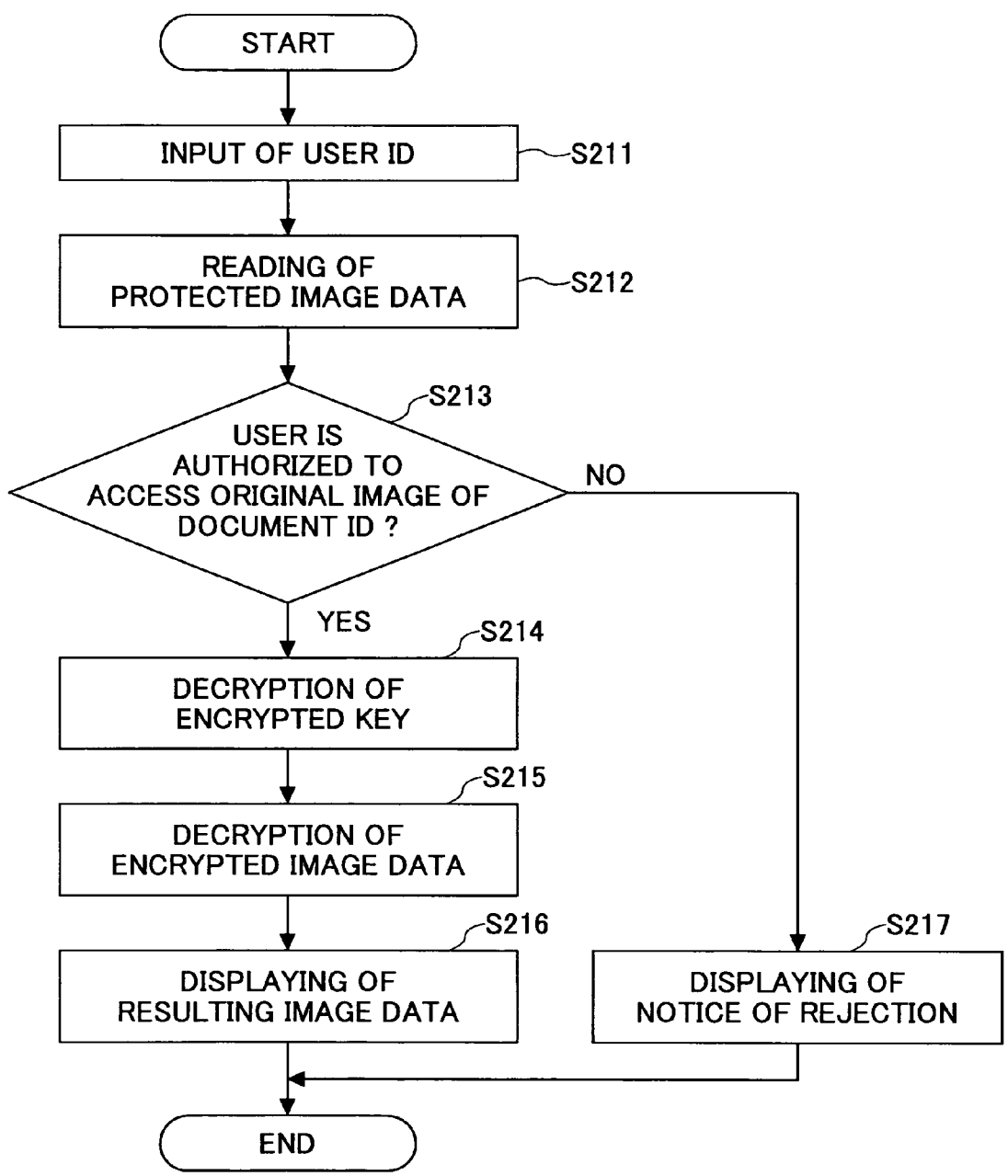

FIG. 8B is a flowchart for illustrating the processing in which the viewing of the protected image data is permitted after the authentication of the user.

In the processing of FIG. 8B, at step S211, the user ID is inputted into the viewer 6 by operation of the user. The viewer 6 recognizes the authenticity of the user to access the secret document by the input user ID.

At step S212, the protected image data is read by the viewer 6 by operation of the user. The viewer unit 51 acquires the encrypted key and the document ID from the protected image data.

At step S213, the viewer 6 determines whether the user concerned is authorized to access the secret document (original image) with the document ID. In the present embodiment, the viewer 6 compares the access permission that is indicated by the user ID and the secret level that is assigned for the document ID, and determines whether viewing of the original image is permitted for the user concerned, based on the result of the comparison.

When viewing of the secret document is permitted for the user concerned (Yes of step S213), the viewer 6 decrypts the encrypted key, and decrypts the encrypted image data with the decrypted key, so that the resulting image data is displayed on the display monitor (steps S214-S216).

When viewing of the secret document is not permitted for the user concerned (No of step S213), the viewer 6 displays a notice of rejection on the display monitor, which notice indicating that the user concerned is not authorized to access the secret document with the document ID and the image data cannot be displayed (step S217).

According to the above-described embodiment, the image data is automatically encrypted when the secret-document mark that indicates that the document concerned is the secret document is contained in the original image 3, and the security of the image data of the secret document acquired with the scanner device can be maintained.

Next, a description will be given of another preferred embodiment of the invention.

In the previous embodiment of FIG. 2, it is determined whether the image data is protected, depending on whether the image data of the original image acquired with the scanner device 4 is detected as containing the secret-document mark. In the present embodiment, the scanner device is provided so that the scanner device requests the user to specify protection of the image data.

The present embodiment differs from the previous embodiment in that the secret-document mark does not exist in the original image 3. In addition, in the present embodiment, the composition of the network is the same as that of FIG. 1A, the overall processing is the same as that FIG. 1B, and the method of encryption and the processing of viewing of the protected image data are the same as those in the previous embodiment.

Figure 9:
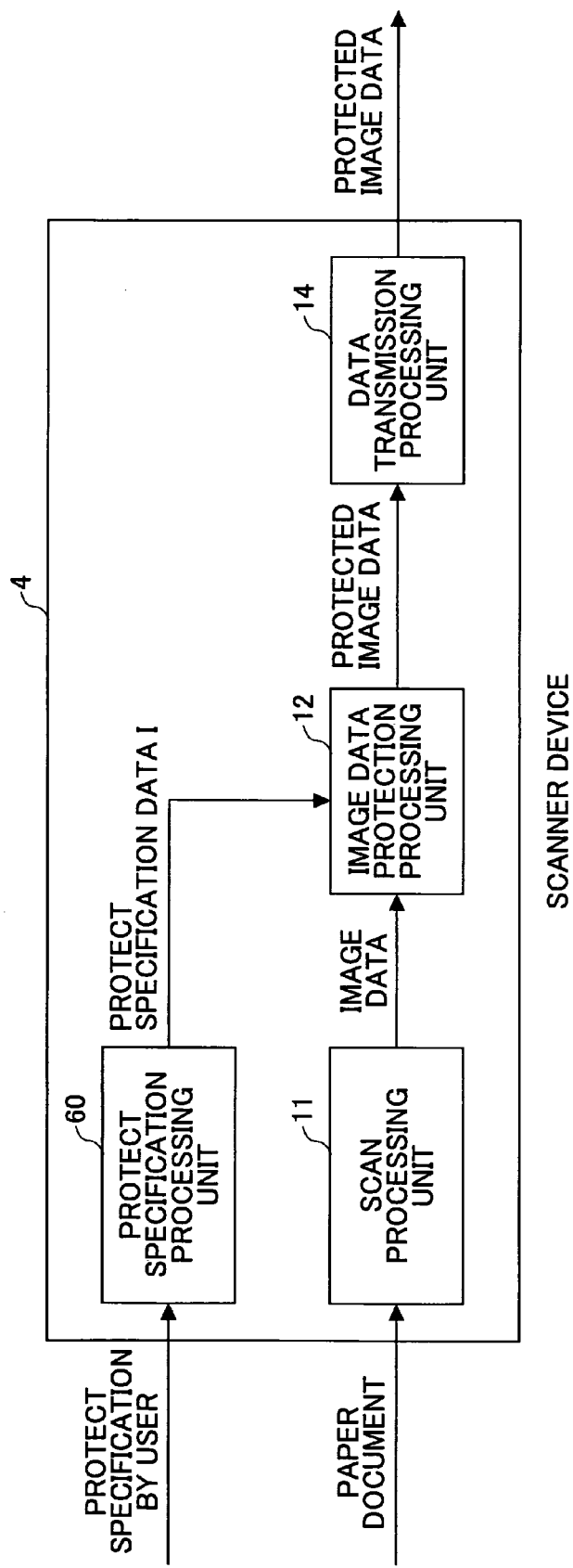
FIG. 9 is a block diagram showing the functional composition of the scanner device in the preferred embodiment of the invention.

FIG. 9 shows the functional composition of the scanner device in the present embodiment.

The scanner device 4 of FIG. 9 differs from that of FIG. 2 in that it comprises the protect specification processing unit 60 which processes the specification of security by the user.

In FIG. 9, the elements that are the same as corresponding elements in FIG. 2 are designated by the same reference numerals, and a description thereof will be omitted.

The protect specification processing unit 60 in the present embodiment receives the input from the user that indicates the specification of the protection of the image data, and outputs the protect specification data I to the image data protection processing unit 12.

Figure 10:
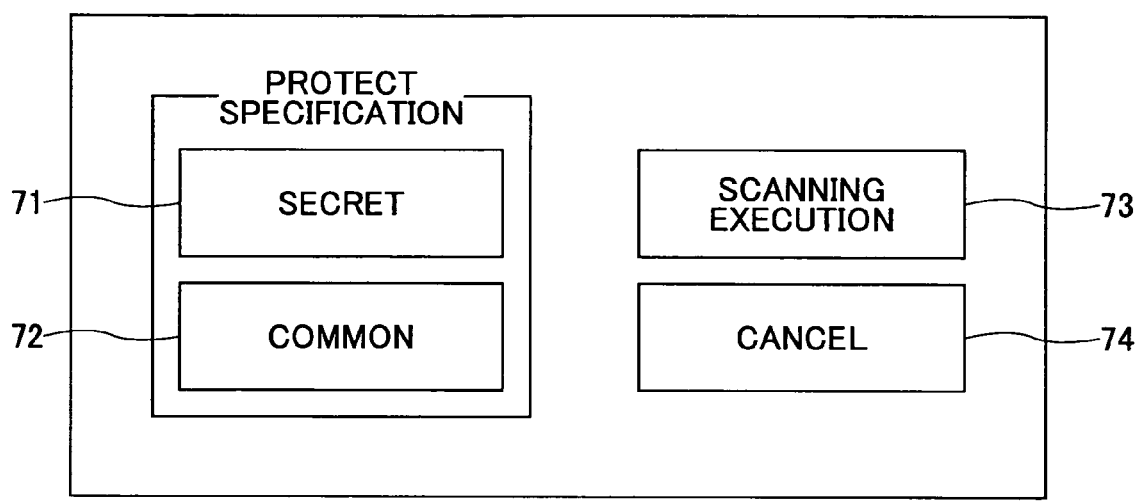
FIG. 10 is a block diagram showing the composition of the protect specification input unit.

A description will be given of the specification of the security by the user. FIG. 10 shows an example of the composition of the protect specification input unit which inputs the specification of the security by the user.

As shown in FIG. 10, the protect specification input unit is constituted with the operation panel using the touch-panel method, or the keyboard. The protect specification input unit of FIG. 10 comprises the "secret" button 71, the "common" button 72, the "scanning execution" button 73 which is used to start scanning of the document, and the "cancel" button 74 which is used to cancel the specification of protection of the image data.

If the "secret" button 71 is pressed, then the protection of the image data is performed. If the "common" button 72 is pressed, the protection of the image data is not performed.

The user selectively presses one of the "secret" button 71 or the "common" button 72 according to the secret level of the secret document.

In the case where the user presses the "secret" button 71, the protect specification processing unit 60 creates the character string, such as "secret level: secret". In the case where the user chooses the "common" button 72, the protect specification processing unit 60 creates the character string, such as "secret level: none", since the protection of the image data is not needed by the user.

The created character string from the protect specification processing unit 60 is output to the image data protection processing unit 12 as the protect specification data I.

Therefore, in the case of the protect specification input unit as shown in FIG. 10, the protect specification data I becomes the character string "secret level:secret" or "secret level: none".

When the image data protection processing unit 12 receives the character string "secrecy level: secret" from the protect specification processing unit 60, the image data protection processing unit 12 encrypts the acquired image data similar to the embodiment of FIG. 2, adds the protect specification data I to the encrypted image data, instead of the document ID, so that the protected image data is created.

Figure 11:
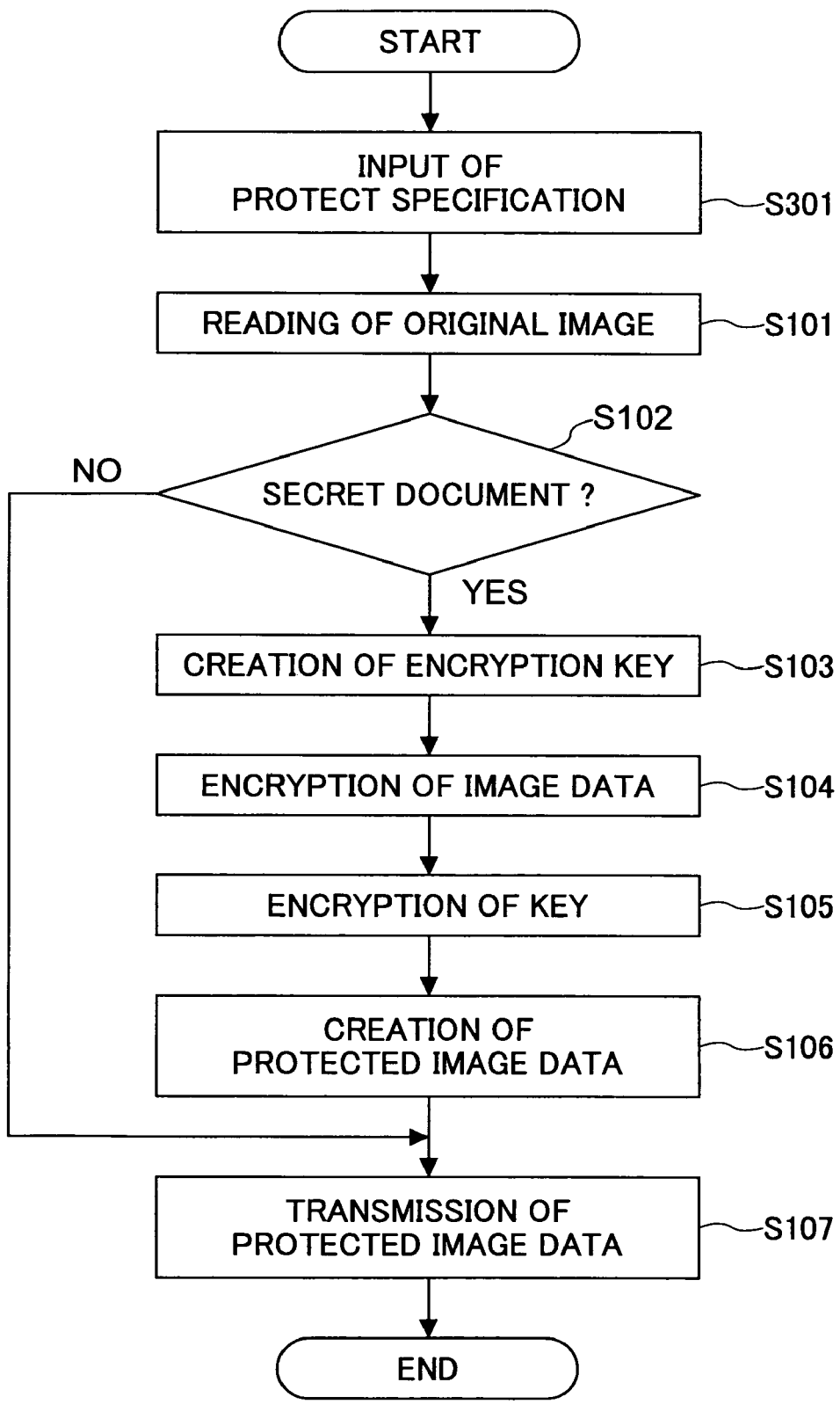
FIG. 11 is a flowchart for illustrating the processing which creates the protected image data by the protect specification of the user.

FIG. 11 is a flowchart for illustrating the processing of creating the protected image data when the user performs inputting of the protect specification using the protect specification input unit shown in FIG. 10.

At step S301, the protect specification corresponding to the "secret" button 71 or the "common" button 72 is input by operation of the user using the protect specification input unit of FIG. 10.

At step S101, the acquisition of the original image is performed by operation of the user. That is, the scan processing unit 11 acquires the image data of the document.

The scanning of the original image is started when the user presses the "scanning execution" button 73, and the contents of the original image are converted into the image data.

The acquired image data is input into the image data protection processing unit 12, and the protect specification data I is inputted into the protect specification processing unit 60.

At step S102, the protect specification processing unit 60 determines whether the document concerned is the secret document.

In the case where the "secret" button 71 is pressed, the protect specification processing unit 60 creates the protect specification data I which is the character string "secret level: secret". In the case where the "common" button 72 is pressed, the protect specification processing unit 60 creates the protect specification data I that is the character string "secret level: none".

When the protect specification data I is "secret level: none" (No of S102), the image data protection processing unit 12 does not create the protected image data even if the image data is passed through.

The subsequent processing of the present embodiment is the same as the processing of the flowchart of FIG. 6, and a brief description of the subsequent processing will be given.

When the protect specification data I is "secret level: secret" (Yes of S102), at step S103, the encryption key creation processing unit 41 creates the encryption key. The created encryption key is inputted into the encryption processing unit 42.

At step S104, the encryption processing unit 42 encrypts the image data.

At step S105, the encryption processing unit 42 encrypts the encryption key.

At step S106, the incidental information adding unit 43 creates the incidental information.

The incidental information adding unit 43 adds the encrypted key and the protect specification data I to the encrypted image data, so that the protected image data is created.

At step S107, the data transmission processing unit 14 transmits the protected image data or the image data.

As described above, the protected image data of the original image to which the protect specification is performed by operation of the user is transmitted to the predetermined device.

The viewing of the protected image data is performed according to the flowchart of FIG. 8A similar to the previous embodiment.

Moreover, as shown in the flowchart of FIG. 8B, when performing the access permission according to the user's authority, the secret level of the protect specification data I and the access permission indicated by the user ID are compared, and it is determined whether viewing of the image data of the original image is permitted for the user concerned.

According to the above-described embodiment, even if there is no security mark in the secret document, it is possible to create the protected image data of the secret document depending on the user's intention.

Next, a description will be given of another preferred embodiment of the invention.

In the present embodiment, the scanner device is provided so that the scanner device requests the user to specify the protection of the image data, similar to the previous embodiment of FIG. 9, which will be described.

The present embodiment is the same as the previous embodiment of FIG. 9 in that the original image 3 does not contain the secret-document mark. But the present embodiment differs from the previous embodiment of FIG. 9 in the method of encryption.

In the following description of the present embodiment, the method of encryption and the viewing method of the protected image data will be focused on.

In addition, the composition of the network is the same as that shown in FIG. 1A, the entire processing of the image data protection is the same as that shown in FIG. 1B, the functional composition of the scanner device is the same as that shown in FIG. 9, respectively, and a description thereof will be omitted.

Figure 12:
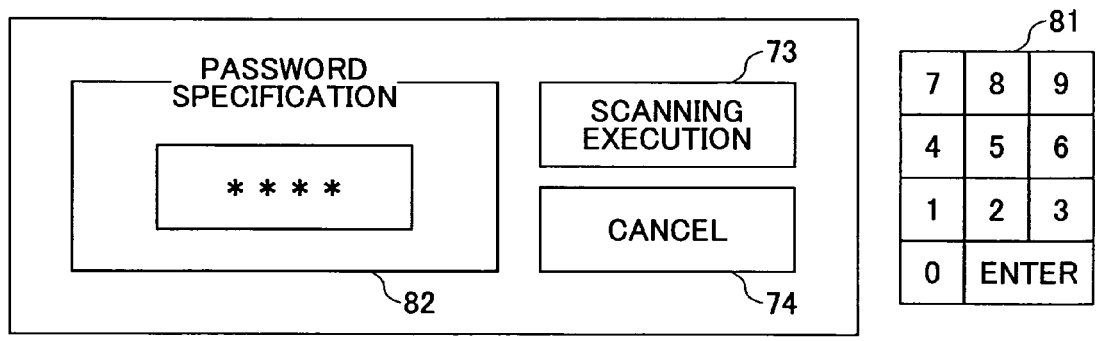
FIG. 12 is a block diagram showing the composition of the protect specification input unit.

FIG. 12 shows another composition of the protect specification input unit with which the user inputs the specification of protection.

The protect specification input unit of FIG. 12 differs from the protect specification input unit of FIG. 10 in that the present embodiment includes the password specification block 82 and the ten keys 81. In the present embodiment, the user judges whether the document 3 to be acquired is the secret document. When it is the secret document and the user requests protection of the image data thereof, the user is required to input the password, the personal identification number (ID), or the like (which will be called the password) from the ten keys 81.

Figure 13:
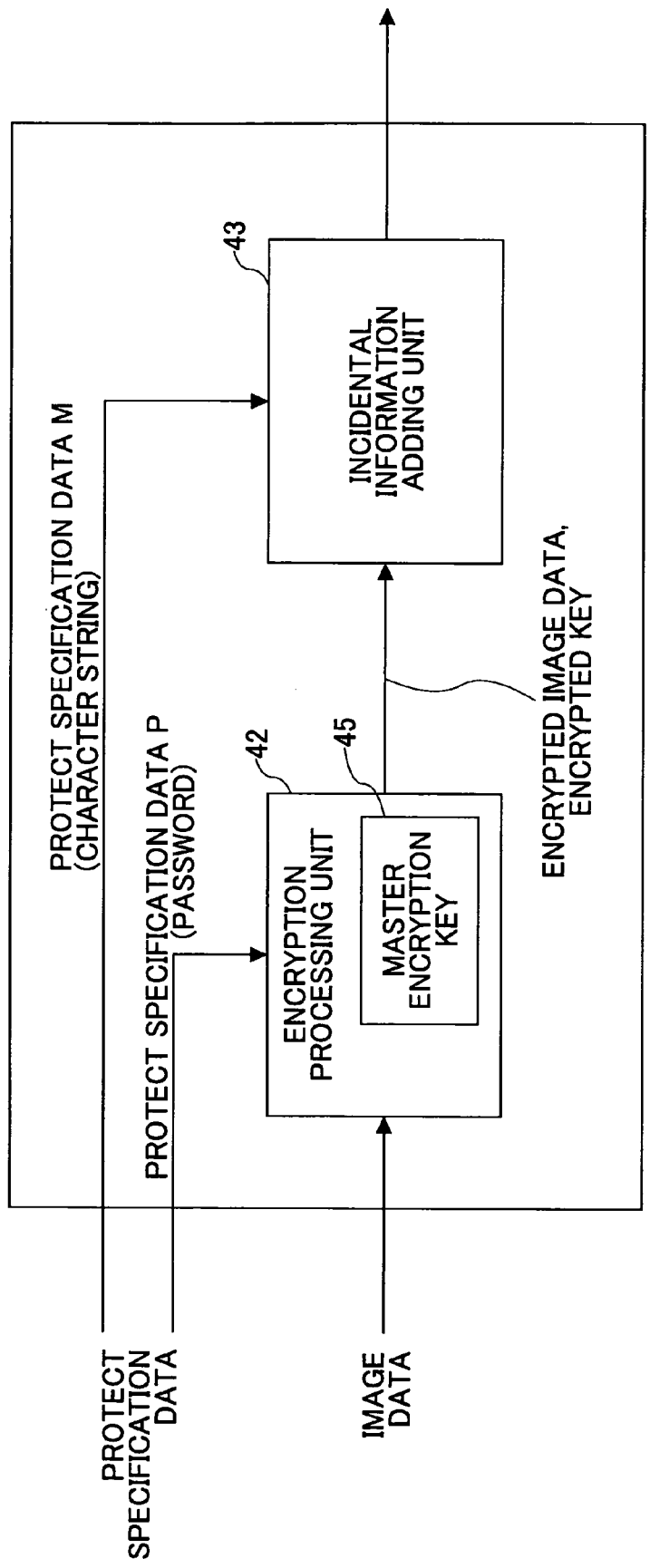
FIG. 13 is a block diagram showing the functional composition of the image data protection processing unit in the preferred embodiment of the invention.

FIG. 13 shows the functional composition of the image data protection processing unit 12 in the case of the protect specification input unit shown in FIG. 12 being provided in the scanner device.

The image data protection processing unit 12 of FIG. 13 differs from that of FIG. 5 in that it does not comprise the encryption key creation processing unit 41.

The protect specification processing unit 60 in the present embodiment supplies the password, input from the protect specification input unit, to the encryption processing unit 42 as being the protect specification data P.

Moreover, the protect specification processing unit 60 in the present embodiment supplies the character string, such as "password protection file", to the incidental information adding unit 43 as being the protect specification data M.

The encryption processing unit 42 encrypts the image data that is acquired with the protect specification data P (password) used as an encryption key.

Moreover, the encryption processing unit 42 encrypts the password by using the master encryption key 45.

The encryption processing unit 42 outputs the encrypted image data and the encrypted password to the incidental information adding unit 43.

The encrypted image data and the encrypted password are inputted into the incidental information adding unit 43 from the code effect processing unit 42. Moreover, the protect specification data M (character string) is inputted from the protect specification information 60 into the incidental information adding unit 43.

The incidental information adding unit 43 adds the encrypted password and the protect specification data M to the encrypted image data, so that the protected image data is created, and outputs the protected image data to the protected image data transmission processing unit 14.

Figure 14A:
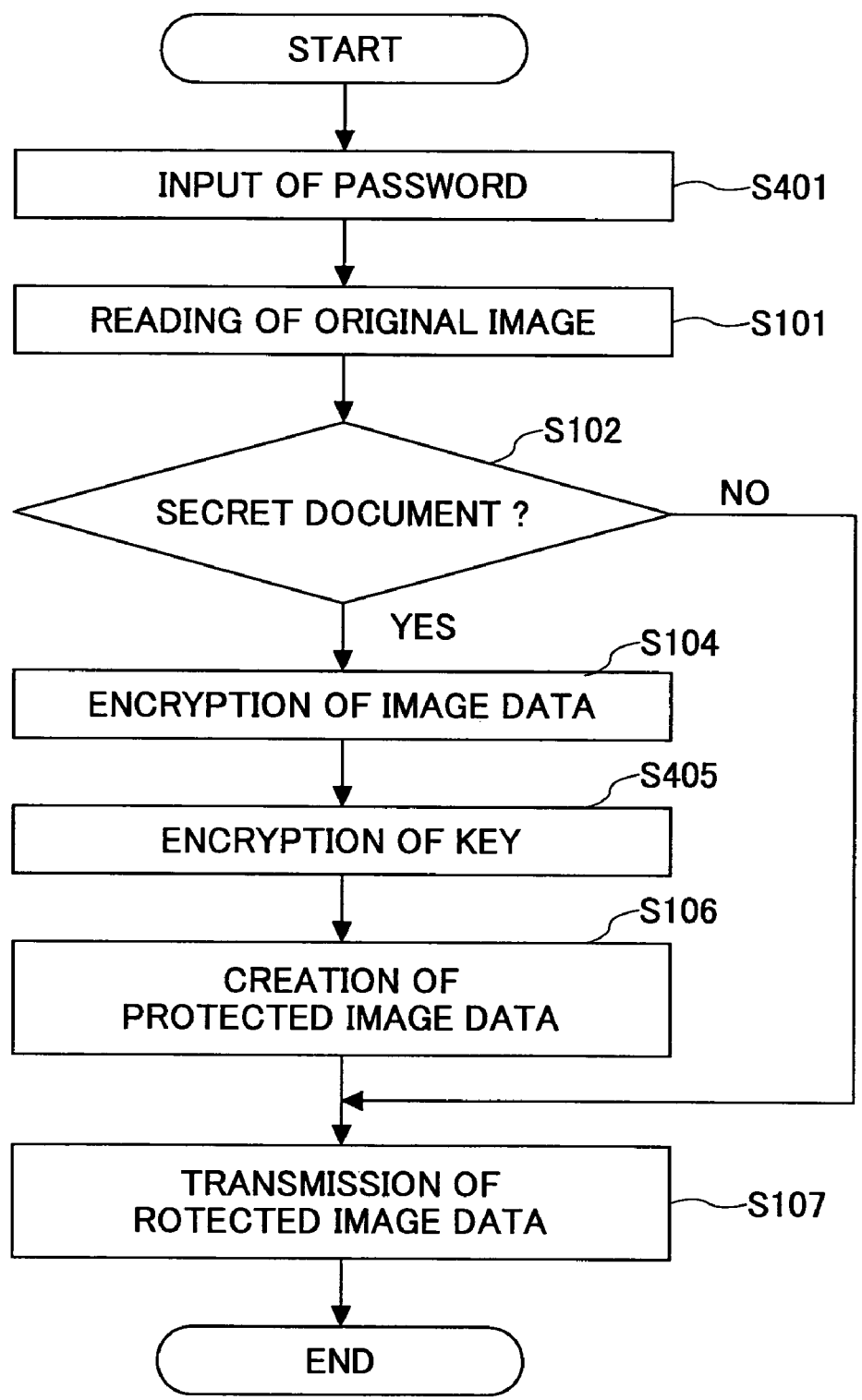
FIG. 14A is a flowchart for illustrating the processing which creates the protected image data by the protect specification of the user.

FIG. 14A is a flowchart for illustrating the creation processing of the protected image data when the user performs inputting of the protect specification from the protect specification input unit as shown in FIG. 12.

At step S401, the password is inputted from the protect specification input unit by operation of the user. This password serves as the protect specification data P.

At step S101, the acquisition of the original image is performed by operation of the user. That is, the scan processing unit 11 acquires the image data of the document. The scanning of the original image is started when the user presses the "scanning execution" button 73, and the contents of the original image are converted into the image data. The acquired image data is input into the image data protection processing unit 12, and the protect specification data P is input into the protect specification processing unit 60.

At step S102, the protect specification processing unit 60 determines whether it is the secret document. The protect specification processing unit 60 recognizes the protect specification-data P, and when the protect specification data P exists, it requests the creation of the protected image data to the image data protection processing unit 12.

That is, the protect specification processing unit 60 outputs the password to the encryption processing unit 42, and outputs the character string, such as "password protection file", to the incidental information adding unit 43, respectively.

When there is no protect specification data P (No of S102), the image data protection processing unit 12 does not create the protected image data even if the image data is passed through the image data protection processing unit 12.

At step S104, the encryption processing unit 42 encrypts the image data (Yes of S102). At this time, the password that is input by the user is used as an encryption key. Hence, it is necessary to use only the password known to the user, in order to view the encrypted image data.

At step S405, the encryption processing unit 42 encrypts the password. In the present embodiment, the encryption processing unit 42 encrypts the password in accordance with the encryption algorithm of RC4 by using the master encryption key 45.

At step S106, the incidental information adding unit 43 creates the protected image data. The incidental information adding unit 43 adds the encrypted password and the protect specification data M to the encrypted image data, so that the protected image data is created.

At step S107, the data transmission processing unit 14 transmits the protected image data or the image data.

As described above, the protected image data of the original image with which the protect specification is performed by operation of the user is transmitted to the predetermined device.

Next, a description will be given of the method of viewing of the protected image data in the present embodiment.

Figure 14B:
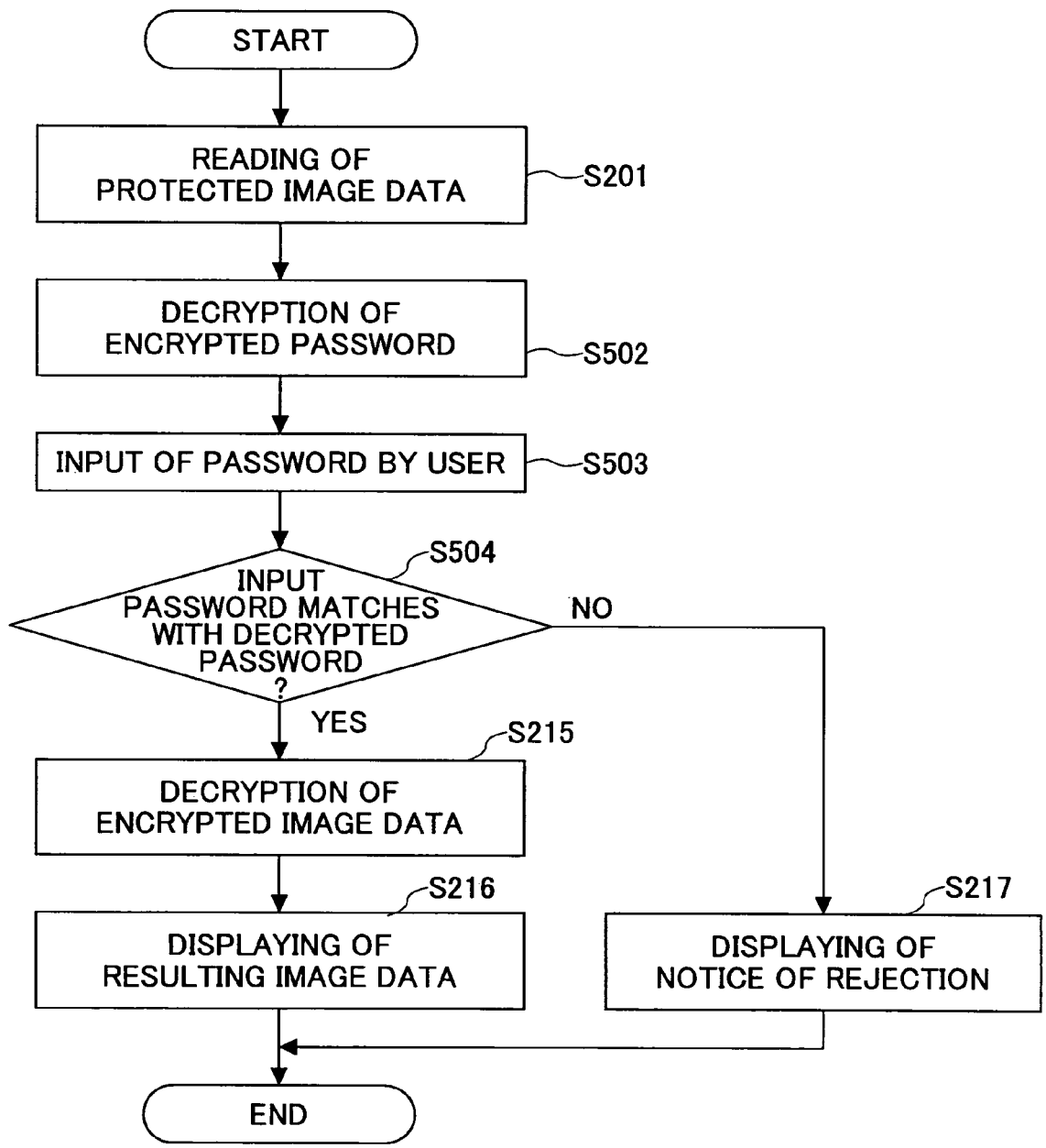
FIG. 14B is a flowchart for illustrating the processing which views the protected image data thus created.

FIG. 14B is a flowchart for illustrating the processing in which viewing of the protected image data is permitted when the matching of the password occurs.

At step S201, the protected image data is read by the viewer 6 by the operation of the user. The viewer unit 51 recognizes the encrypted password from the protected image data.

At step S502, the viewer unit 51 decrypts the encrypted password. The viewer unit 51 decrypts the encrypted password by using the master encryption key 45.

At step S503, the password is input by operation of the user. The user inputs the password that is the same as that input when acquiring the original image 3 at step S401 of FIG. 14A.

At step S504, the viewer unit 51 determines whether the inputted password matches with the decrypted password.

The viewer unit 51 progresses to the next step S215 only when the matching of the password input by the user and the decrypted password occurs.

When the matching of the password occurs (Yes of step S504), the viewer unit 51 at step S215 decrypts the image data with the decrypted password. Subsequently, the display unit 52 at step S216 displays the image data on the display monitor.

When the matching of the password does not occur (No of step S504), the notice of rejection, which indicates that the protected image data cannot be displayed, is displayed on the display monitor (step S217).

According to the above-described embodiment, the viewing of the protected image data is permitted for only the user who has input the password, and the protection of the image data acquired with the scanner device can be attained according to the user's intention.

Next, a description will be given of another preferred embodiment of the invention.

In the previous embodiment of FIG. 2, it is determined whether the acquired image data is protected, depending on the presence of the secret-document mark, and in the embodiments of FIG. 9 and FIG. 13, it is determined whether the acquired image data is protected, depending on the operation of the user.

In the scanner device of the present embodiment, it is determined whether the image data is protected, depending on both the presence of the secret-document mark and the operation of the user. That is, the scanner device of the present embodiment is provided so that the image data will be protected if there is either the secret-document mark of the original image 3 or the operation of the user.

Figure 15A:
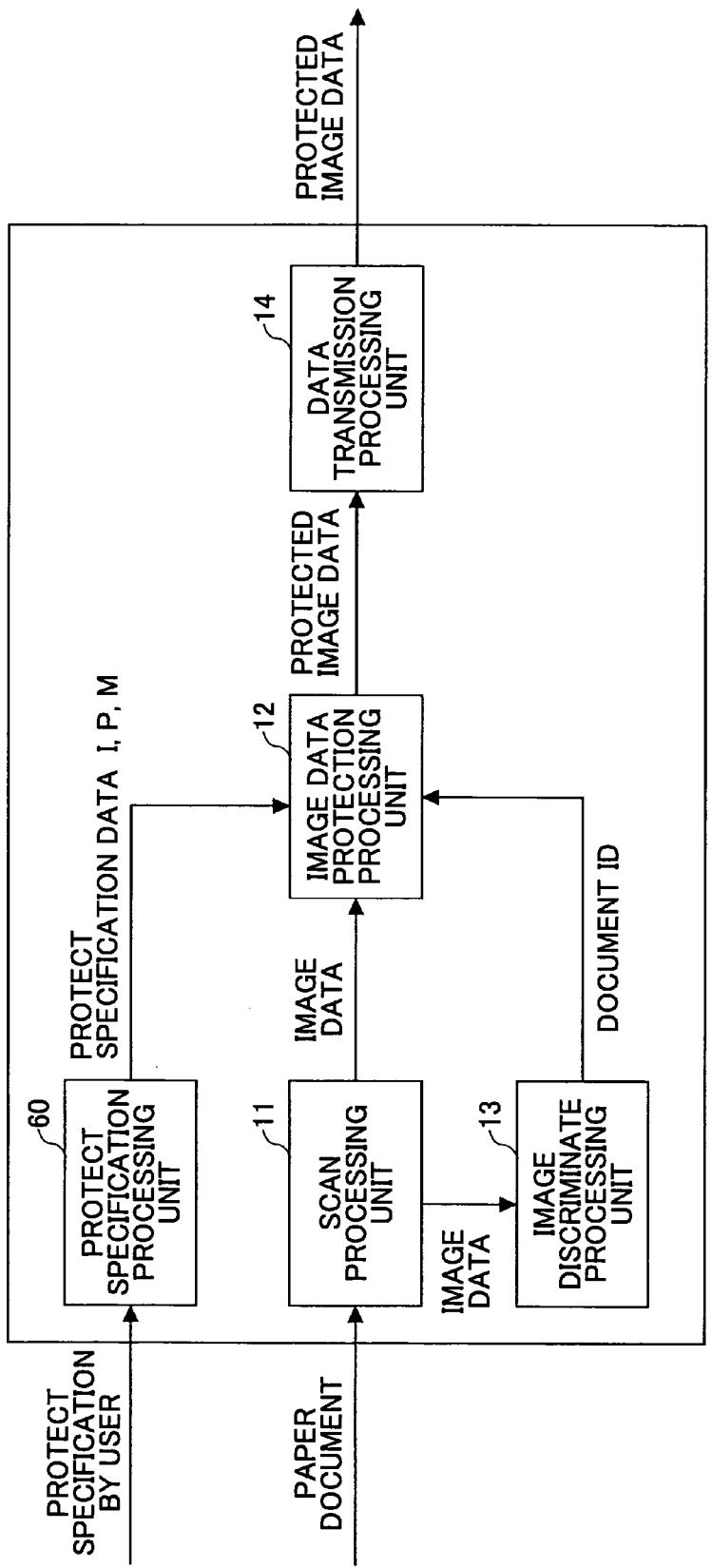
FIG. 15A is a block diagram showing the functional composition of the scanner device in the preferred embodiment of the invention.

FIG. 15A shows an example of the functional composition of the scanner device in the present embodiment.

The scanner device of FIG. 15A is constituted so that the scanner device comprises the protect specification processing unit 60, the scan processing unit 11, the image discriminate processing unit 13, the image data protection processing unit 12, and the protected image data transmission processing unit 14.

In FIG. 15A, the elements that are the same as corresponding elements in the functional composition of FIG. 1 or FIG. 9 are designated by the same reference numerals, and a description thereof will be omitted.

The scanner device of FIG. 15A differs from the previous embodiments of FIG. 2 and FIG. 9 in that it comprises both the image discriminate processing unit 13 and the protect specification processing unit 60.

The image discriminate processing unit 13 analyzes the digital data that is acquired by the scan processing unit 11, and determines whether the optically read document is the secret document.

In the case of the secret document, the document ID that identifies the original image is extracted from the secret-document mark, and the document ID is outputted to the image data protection processing unit 12.

The protect specification processing unit 60 outputs the protect specification data I, the protect specification data P, or the protect specification data M to the image data protection processing unit 12 based on the operation of the user, which is similar to the embodiments of FIG. 11 and FIG. 14A or the protect specification input unit shown in FIG. 12.

Figure 15B:
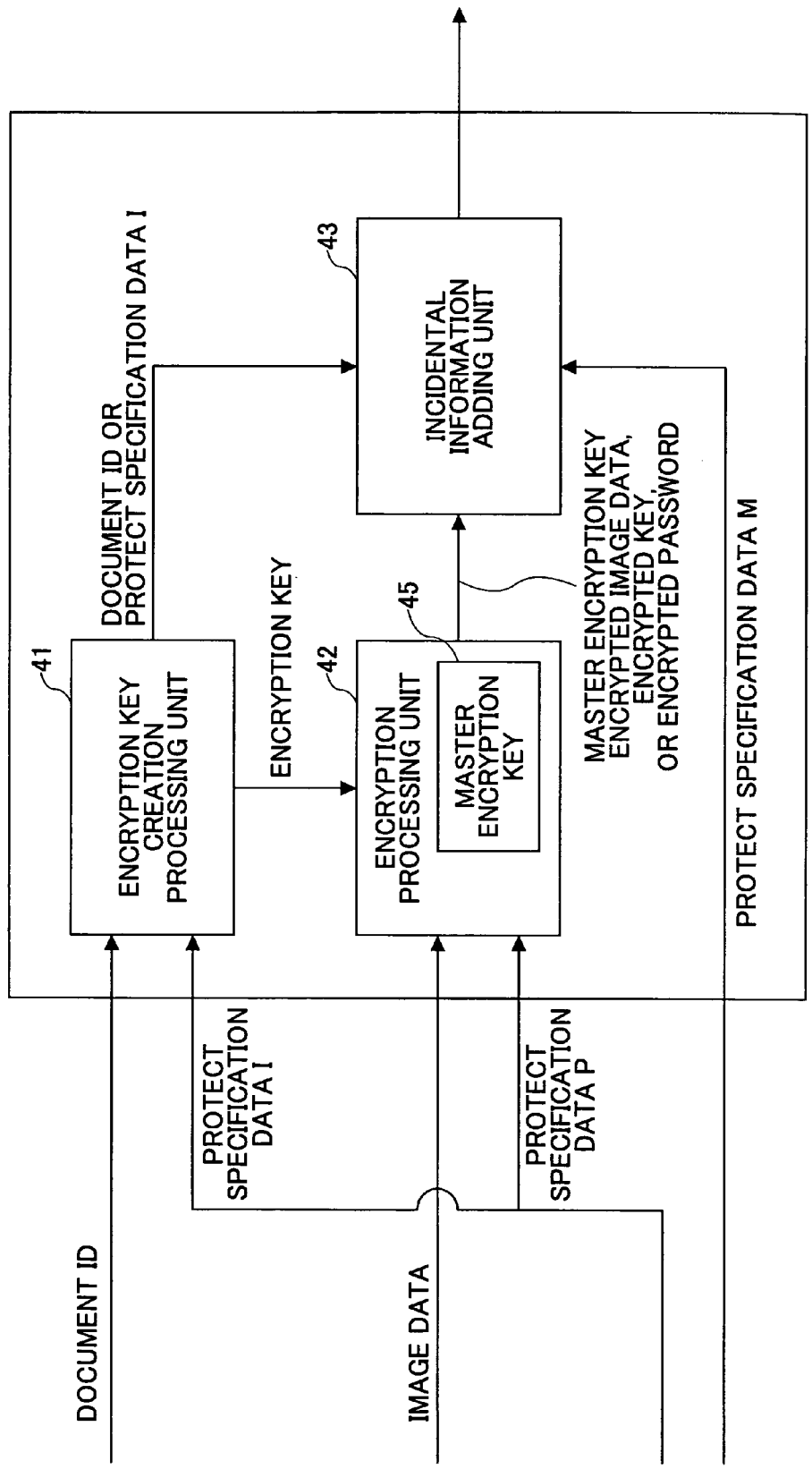
FIG. 15B is a block diagram showing the functional composition of the image data protection processing unit.

FIG. 15B shows the functional composition of the image data protection processing unit 12 in the present embodiment.

In the image data protection processing unit 12 of FIG. 15B, the document ID extracted by the image discriminate processing unit 13 is inputted into the encryption key creation processing unit 41.

Moreover, the protect specification data I that is input from the protect specification input unit as shown in FIG. 10 is input into the encryption key creation processing unit 41.

The protect specification data P which is input from the protect specification input unit as shown in FIG. 12 is input into the encryption processing unit 42, and the protect specification data M is inputted into the incidental information adding unit 43.

The encryption key creation processing unit 41 creates the encryption key when the document ID or the protect specification data I, such as "secret level:secret", is input. Then, the encryption key creation processing unit 41 inputs the encryption key into the encryption processing unit 42.

When the document ID is not input, or when the protect specification data I, such as "secrecy level: none", is input, the encryption key creation processing unit 41 does not create the encryption key.

The encryption processing unit 42 receives the encryption key or the protect specification data P. The encryption processing unit 42 performs encryption processing using the inputted encryption key or the protect specification data P. That is, the image data is encrypted by using the password input by the user or the encryption key.

The incidental information adding unit 43 performs the same processing as shown in FIG. 5 or FIG. 13. However, in this embodiment, the incidental information adding unit 43 receives either the document ID, the protect specification data I or the protect specification data M.

The incidental information adding unit 43 adds any one of the document ID, the protect specification data I, or the protect specification data M to the encrypted image data.

Figure 16:
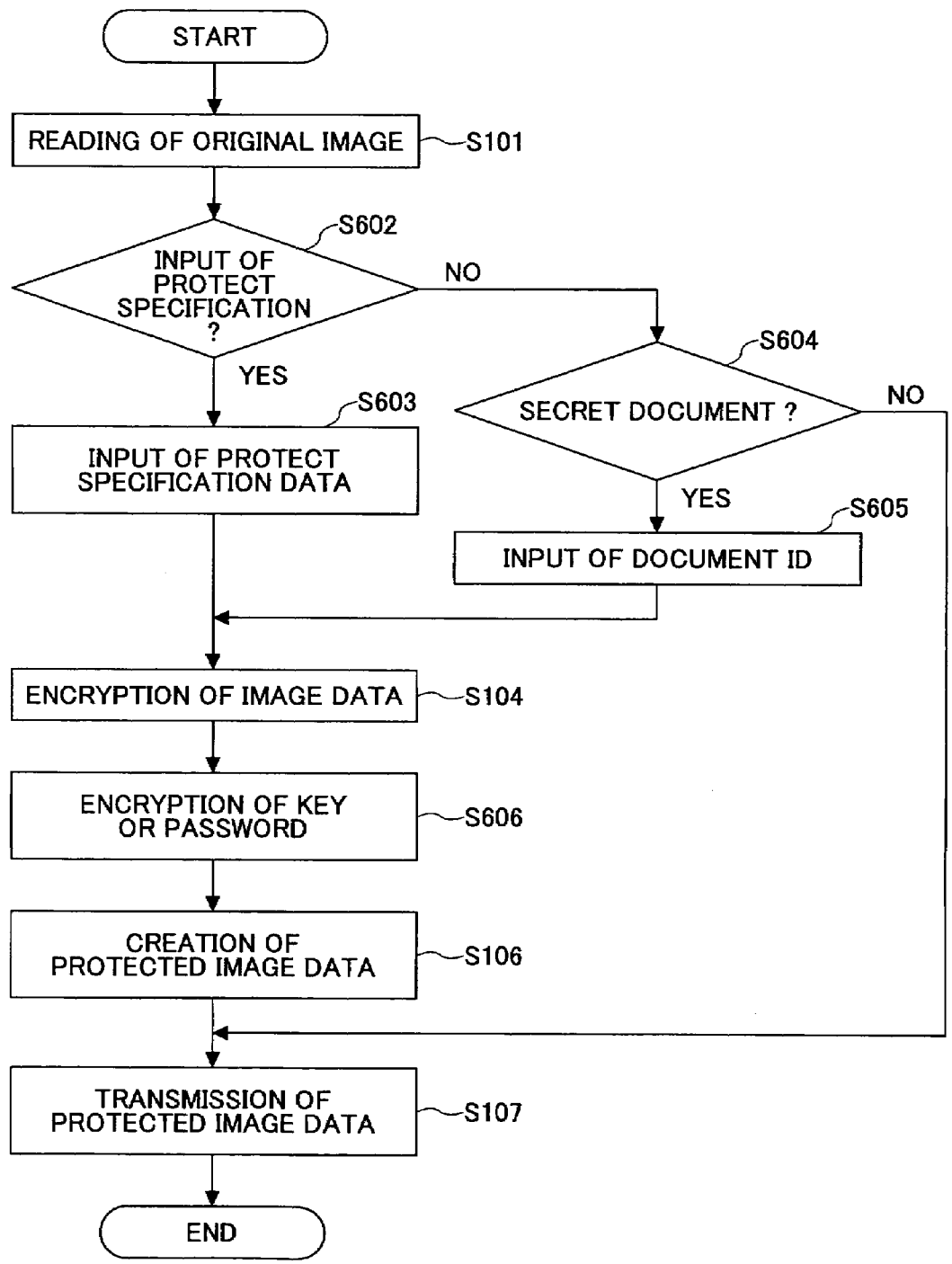
FIG. 16 is a flowchart for illustrating the processing which creates the protected image data based on the presence of the secret-document mark and the protect specification of the user.

FIG. 16 is a flowchart for illustrating the processing that creates the protected image data based on both the presence of the secret-document mark and the operation of the user.

At step S101, the scan processing unit 11 acquires the image data of the original image by operation of the user. The acquired image data is input into the image data protection processing unit 12 and the image discriminate processing unit 13.

At step S602, it is determined whether there is any input of the protect specification by the user.

The protect specification processing unit 60 determines whether there is a depression of the "secret" button 71 as in the embodiment of FIG. 11 or an input of the password as in the embodiment of FIG. 14A.

At step S603, the protect specification processing unit 60 inputs, in the case of the protect specification input unit of FIG. 10, the protect specification data I to the encryption key creation processing unit 41, and inputs, in the case of the protect specification input unit of FIG. 12, the protect specification data P to the encryption processing unit 42 (Yes of step S602).

As a result of the step S603, the character string "secret level: secret" is input into the encryption key creation processing unit 41 or the password is input into the encryption processing unit 42.

At step S604, the image discriminate processing unit 13 determines whether the document concerned is the secret document. The image discriminate processing unit 13 detects the secret-document mark from the image data, and, when there is the secret-document mark, the image discriminate processing unit 13 determines that it is the secret document (Yes of step S604).

When there is no secret-document mark (No of S604), the protected image data is not created, but the image data is transmitted at step S107, and the processing is completed.

At step S605, the image discriminate processing unit 13 extracts the document ID that identifies the original image from the secret-document mark. The extracted document ID is input into the encryption key creation processing unit 41 of the image data protection processing unit 12.

At step S104, the encryption processing unit 42 encrypts the image data. In the present embodiment, the encryption processing unit 42 encrypts the image data in accordance with the encryption algorithm of RC4 mentioned above, by using the encryption key or the password.

At step S606, the encryption processing unit 42 encrypts the encryption key or the password. In the present embodiment, the encryption processing unit 42 encrypts the encryption key or the password in accordance with the encryption algorithm of RC4, using the master encryption key 45.

At step S106, the incidental information adding unit 43 creates the protected image data. In the present embodiment, the incidental information adding unit 43 adds, to the encrypted image data, one of the encrypted key or the encrypted password and any one of the document ID, the protect specification data I or the protect specification data M, so that the protected image data is created.

At step S107, the data transmission processing unit 14 transmits the protected image data or the image data.

As described above, the image data protected by encryption is transmitted to the predetermined device.

The processing of viewing of the protected image data is performed according to the flowchart of FIG. 8A or FIG. 8B, or the flowchart of FIG. 14B.

When reading the protected image data, the viewer 6 determines whether any of the document ID, the protection specification data I, or the protection specification data M is added to the protected image data, and performs the processing according to the incidental information.

That is, when the protected image data is created based on the document ID or the protect specification data I on the secret-document mark, the viewing processing of the protected image data is performed according to the flowchart of FIG. 8A or FIG. 8B.

When the protected image data is created based on the protect specification data P, the viewing processing of the protected image data is performed according to the flowchart of FIG. 14B.

According to the embodiment of FIG. 15A, when the image discriminate processing unit 13 determines that the document concerned is the secret document, the protection of the image data can be performed even if the user specifies that it is not necessary to protect of the image data.

On the contrary, even when the image discriminate processing unit 13 determines that the document concerned is not the secret document, the protection processing of the image data can be performed if the user demands the protection of the image data.

By performing the processing as in the embodiment of FIG. 15A, the secret document that should be protected is appropriately converted into the protected image data.

Next, a description will be given of another preferred embodiment of the invention.

In the present embodiment, the image data protection processing unit that encrypts the image data and creates the protected image data, and the image data acquiring unit that scans the original image optically to acquire the image data, are provided separately.

Figure 17A:
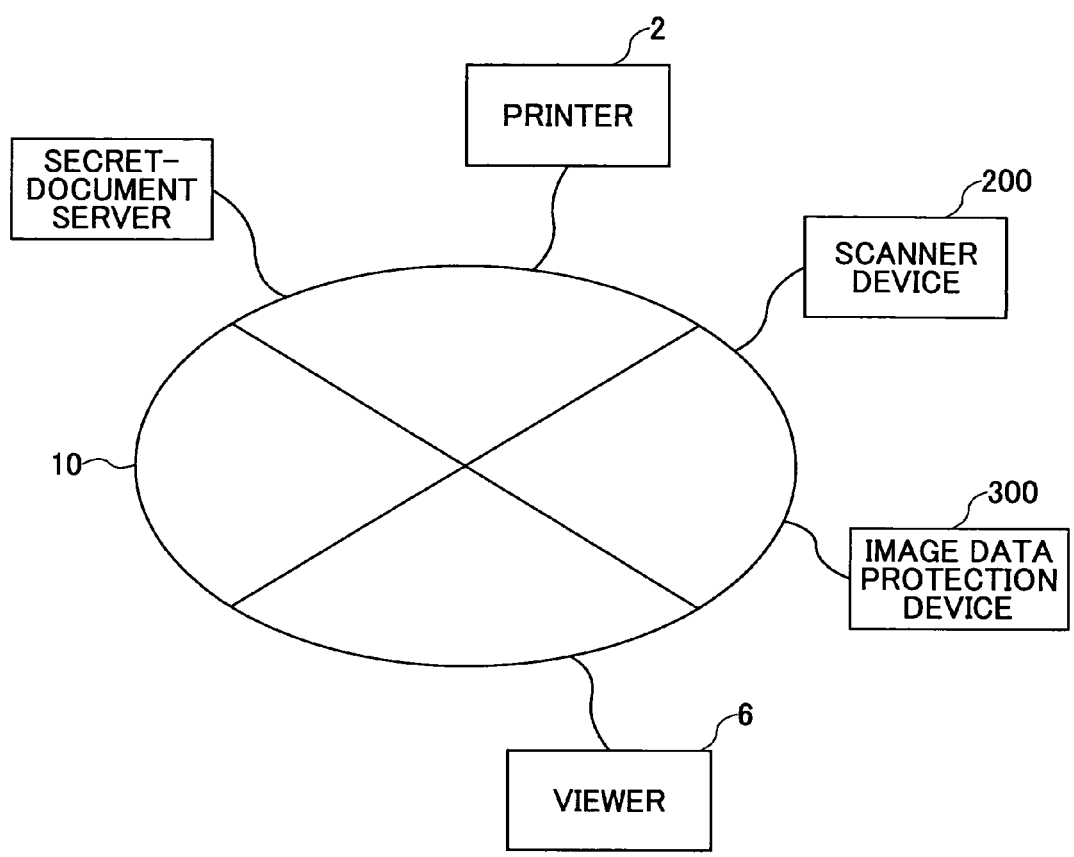
FIG. 17A is a block diagram showing the composition of the network in which the scanner device of the invention is embodied.

FIG. 17A shows the composition of the network in which the scanner device of the invention is embodied.

As shown in FIG. 17A, the present embodiment differs from that of FIG. 1A in that the scanner device 200 and the image data protection device 300 are connected through the network 10.

Therefore, in the case of the present embodiment, the image data that is acquired with the scanner device 200 is transmitted to the image data protection device 300 through the network 10.

In addition, it is possible that the scanner device 200 and the image data protection device 300 are connected directly.

For the purpose of transmission of the image data from the scanner device 200 to the image data protection device 300, the communication may be performed by using the SSL (Secure Sockets Layer) protocol, for example.

The SSL is provided to combine the security technology, such as the public-key encryption, the common key encryption, the digital certificate, and the hash function, and it is possible to prevent the altering and eavesdropping of data or the spoofing. The method of performing the communication by the SSL protocol is known in the art.

By transmitting the image data to the image data protection device 300 from the scanner device 200 by using the communication protocol in which security is considered like the SSL protocol, it is possible to secure the safety of the image data before creating the protected image data.

Next, the composition of the scanner device 200 and the image data protection device 300 in the present embodiment will be described.

FIG. 17B shows an example of the functional composition of the scanner system that comprises the scanner device 200 and the image data protection device 300.

The scanner device 200 is constituted so that the scanner device 200 comprises the protect specification processing unit 60, the scan processing unit 11, the image discriminate processing unit 13, and the data protection transmitting processing unit 51.

Moreover, the image data protection device 300 is constituted so that the image data protection device 300 comprises the data protection reception processing unit 52, the image data protection processing unit 12, and the data transfer processing unit 14.

In FIG. 17B, the elements that are the same as corresponding elements in FIG. 15A are designated by the same reference numerals, and a description thereof will be omitted.

Since the scanner device 200 comprises the protect specification processing unit 60 and the image discriminate processing unit 13, it can create the protected image data based on both the request of protection by the user and the result of detection of the presence of the secret-document mark as in the previous embodiment of FIG. 15A.

As shown in FIG. 17B, the acquired image data, the document ID, the protect specification data I, the protect specification data P, and the protect specification data M are input into the data protection transmitting processing unit 51.

The data protection transmitting processing unit 51 combines the image data, the document ID, the protect specification data I, the protect specification data P, and the protect specification data M into a predetermined file (which will be called the protect specification image data), and transmits the same to the image data protection device 300 by using the SSL protocol.

In addition, as clearly described above in the previous embodiment, the protect specification image data does not include all the image data, the document ID, the protect specification data I, the protect specification data P, and the protect specification data M.

The contents of the protect specification image data vary depending on whether the protect specification of the secret document is performed by either the secret-document mark or the protect specification input unit of FIG. 10 or FIG. 12.

Namely, when the protect specification is performed by the secret-document mark, the protect specification image data contains the image data and the document ID. When the protect specification is performed by the protect specification input unit of FIG. 10, the protect specification image data contains the image data and the protect specification data I. When the protect specification is performed by the protect specification input unit of FIG. 12, the protect specification image data contains the image data, the protect specification data P, and the protect specification data M.

The image data protection device 300 is constituted so that the image data protection device 300 comprises the data protection reception processing unit 52, the image data protection processing unit 12, and the data transfer processing unit 14.

The data protection reception processing unit 52 receives the protect specification image data transmitted by the data protection transmitting processing unit 51, and divides the received data into the acquired image data, the document ID, the protect specification data I, the protect specification data P, and the protect specification data M. The data protection reception processing unit 52 supplies the resulting data of the received protect specification image data to the image data protection processing unit 12.

Since the image data, the document ID, the protect specification data I, the protect specification data P, and the protect specification data M, which are input into the image data protection processing unit 12, are the same as those in the embodiment of FIG. 15B, respectively, the image data protection processing unit 12 creates the protected image data similar to the embodiment of FIG. 15B described above. The image data protection processing unit 12 inputs the protected image data to the data transmission processing unit 14.

The data transmission processing unit 14 transmits the received protected image data to the network, such as LAN, the PC or the server through the Ethernet, the USB interface, or the parallel cable.

In addition, the processing of viewing of the protected image data is performed similar to the embodiment of FIG. 15A.

According to the embodiment of FIG. 17B, the scanner system may be constituted with one image data protection device 300 and one scanner device 200 that acquire images from two or more computers, and the processing of creation of the protected image data may be assigned to and performed by the scanner system.

Since the scanner system is constituted such that only one image data protection device 300 is provided, what is needed is just to provide the image data protection device 300 which has the master encryption key 45 shared with the viewer 6, and improvement in security can be aimed at.

On the contrary, the scanner system may include one scanner device 200 and two or more image data protection devices 300. In the case where the image data acquired by the one scanner device 200 must be transmitted to many users as the protected image data, the two or more image data protection devices 300 can create the protected image data, and improvement in performance can be attained.

The present invention is not limited to the above-described embodiments, and variations and modifications may be made without departing from the scope of the present invention.

Further, the present application is based on Japanese patent application No. 2003-392767, filed on Nov. 21, 2003, the entire contents of which are hereby incorporated by reference.

What is claimed is:

1. A scanner device comprising:
 a scan processing unit to optically read an image formed on a document,
 a protect specification data detection unit to detect protect specification data that is contained in the image to request protection of image data of the image, the protect specification data printed on the document as a document identification indicating that the document is a secret document;
 and a protected image data creation unit to create the encryption key and to encrypt the image data of the image containing the protect specification data, in response to a detection signal of the protect specification data detection unit that indicates detection of the protect specification data in the image has occurred, so as to create protected image data and to encrypt the encryption key using the master encryption key;
 wherein the protected image data creation unit is coupled to a viewer device, the viewer device to determine whether a user is permitted to view the protected image data based on a comparison of a secret level assigned to a document identification acquired from the protected image data with an access level authorized by a user identification acquired from the user.

2. The scanner device according to claim 1 wherein the protect specification data detection unit and the protected image data creation unit are separate from each other.

3. A scanner device comprising:
 a scan processing unit to optically read an image formed on a document,
 a protect specification data input unit to input a protect specification data that requests protection of image data of the image, the protect specification data printed on the document as a document identification indicating that the document is a secret document;
 and a protected image data creation unit to create the encryption key and to encrypt the image data of the image, in response to a detection signal of the protect specification data input unit that indicates the protect specification data has been input, so as to create protected image data and to encrypt the encryption key using the master encryption key;
 wherein the protected image data creation unit is coupled to a viewer device, the viewer device to determine whether a user is permitted to view the protected image data based on a comparison of a secret level assigned to a document identification acquired from the protected image data with an access level authorized by a user identification acquired from the user.

4. The scanner device according to claim 3 wherein the protect specification data input unit and the protected image data creation unit are separate from each other.

5. An image protection method comprising:
 protecting image data of an image formed on a document optically read by a scanner device,
 detecting protect specification data that is contained in the image to request protection of the image data of the image, the protect specification data printed on the document as a document identification indicating that the document is a secret document;
 and encrypting the image data of the image containing the protect specification data by creating a encryption key and encrypting that encryption key by the master key, in response to a detection signal that indicates detection of the protect specification data in the image has occurred, so as to create protected image data that is released only to users having an access level matching or exceeding a secret level assigned to a document identification acquired from the protected image data.

6. An image protection method comprising:
 protecting image data of an image formed on a document optically read by a scanner device,
 inputting protect specification data that requests protection of the image data of the image, the protect specification data printed on the document as a document identification indicating that the document is a secret document;
 and encrypting the image data of the image by creating a encryption key and encrypting that encryption key by the master key, in response to a detection signal that indicates that the protect specification data has been input, so as to create protected image data that is released only to users having an access level matching or exceeding a secret level assigned to a document identification acquired from the protected image data.

7. A scanner system comprising:
 a scanner device optically reads an image formed on a document,
 a protect specification data detection unit to detect protect specification data that is contained in the image to request protection of image data of the image, the protect specification data printed on the document as a document identification indicating that the document is a secret document;
 a protected image data creation unit to create the encryption key and to encrypt the image data of the image containing the protect specification data, in response to a detection signal from the protect specification data detection unit that indicates detection of the protect specification data in the image has occurred, so that a protected image data is created and to encrypt the encryption key using the master encryption key;
 an image data decryption unit first decrypt the encryption key by using the master key then to decrypt the protected image data created by the protected image data creation unit;
 and a decrypted image displaying unit to display the decrypted image data created by the image data decryption unit;
 wherein the scanner device comprises the protect specification data detection unit and the protected image data creation unit;

wherein a viewer comprises the image data decryption unit and the decrypted image displaying unit and the viewer is operable to determine whether a user is permitted to view the protected image data based on a comparison of a secret level assigned to a document identification acquired from the protected image data with an access level authorized by a user identification acquired from the user.

* * * * *